(12) United States Patent
Xu et al.

(10) Patent No.: US 12,193,015 B2
(45) Date of Patent: Jan. 7, 2025

(54) CONTROL CHANNEL DESIGNS FOR DYNAMIC FULL DUPLEX ENABLING

(71) Applicant: QUALCOMM Incorporated, San Diego, CA (US)

(72) Inventors: Huilin Xu, Temecula, CA (US); Muhammad Sayed Khairy Abdelghaffar, San Jose, CA (US); Wanshi Chen, San Diego, CA (US); Hwan Joon Kwon, San Diego, CA (US); Renqiu Wang, San Diego, CA (US); Hung Dinh Ly, San Diego, CA (US); Ahmed Attia Abotabl, San Diego, CA (US); Yuchul Kim, San Diego, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 17/483,893

(22) Filed: Sep. 24, 2021

(65) Prior Publication Data

US 2022/0104245 A1 Mar. 31, 2022

Related U.S. Application Data

(60) Provisional application No. 63/084,547, filed on Sep. 28, 2020.

(51) Int. Cl.
*H04W 72/12* (2023.01)
*H04L 5/14* (2006.01)
*H04W 72/23* (2023.01)

(52) U.S. Cl.
CPC .............. *H04W 72/23* (2023.01); *H04L 5/14* (2013.01)

(58) Field of Classification Search
CPC ........ H04W 72/23; H04L 5/14; H04L 5/0053; H04L 5/0094; H04L 5/0044
See application file for complete search history.

(56) References Cited

U.S. PATENT DOCUMENTS

2016/0285486 A1\* 9/2016 Qin ........................... H04L 5/14
2016/0330011 A1   11/2016 Lee et al.
(Continued)

FOREIGN PATENT DOCUMENTS

| WO | WO-2020043137 A1 | 3/2020 |
| WO | WO-2021133953 A1 | 7/2021 |
| WO | WO-2022026118 A1 \* | 2/2022 |

OTHER PUBLICATIONS

International Search Report and Written Opinion—PCT/US2021/052180—ISA/EPO—Jan. 19, 2022.

*Primary Examiner* — Walli Z Butt
(74) *Attorney, Agent, or Firm* — Holland & Hart LLP

(57) ABSTRACT

Methods, systems, and devices for wireless communications are described. Generally, a base station may dynamically and reliably indicate that pending transmissions are part of a full duplex operation via downlink control information (DCI) designs described herein. For example, a base station may transmit, to a user equipment (UE) a DCI including no more than one downlink grant and no more than one uplink grant for a full duplex operation. In some examples, the base station may transmit a first-stage DCI including partial information, and second-stage DCIs including full uplink and downlink grants for a full duplex operation. In some examples, the base station may configure periodic or semi-periodic uplink and downlink resources that may overlap in time, and may dynamically indicate, to the UE, whether the overlapping uplink and downlink resources are scheduled for a full duplex operation.

28 Claims, 20 Drawing Sheets

(56) References Cited

U.S. PATENT DOCUMENTS

| | | | |
|---|---|---|---|
| 2018/0098307 A1* | 4/2018 | Yang | H04L 5/0094 |
| 2018/0352541 A1* | 12/2018 | Le | H04W 72/20 |
| 2019/0191429 A1* | 6/2019 | Stern-Berkowitz | H04L 1/1887 |
| 2019/0357149 A1 | 11/2019 | Zhang | |
| 2020/0052865 A1* | 2/2020 | Liou | H04W 74/0808 |
| 2021/0329660 A1* | 10/2021 | Zhang | H04W 72/0446 |
| 2023/0276424 A1* | 8/2023 | Wang | H04W 72/541 370/329 |

* cited by examiner

CONTROL CHANNEL DESIGNS FOR DYNAMIC FULL DUPLEX ENABLING

CROSS REFERENCE

The present application for patent claims the benefit of U.S. Provisional Patent Application No. 63/084,547 by XU et al., entitled "CONTROL CHANNEL DESIGNS FOR DYNAMIC FULL DUPLEX ENABLING," filed Sep. 28, 2020, assigned to the assignee hereof, and expressly incorporated by reference herein.

FIELD OF TECHNOLOGY

The following relates to wireless communications, including control channel designs for dynamic full duplex enabling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, a UE may support half duplex operations and full duplex operations.

SUMMARY

The described techniques relate to improved methods, systems, devices, and apparatuses that support control channel designs for dynamic full duplex enabling. Generally, a base station may dynamically and reliably indicate that pending transmissions are part of a full duplex operation via downlink control information (DCI) designs described herein. For example, a base station may transmit, to a user equipment (UE) a DCI including no more than one downlink grant and no more than one uplink grant for a full duplex operation. In some examples, the base station may transmit a first-stage DCI including partial information, and second-stage DCIs including full uplink and downlink grants for a full duplex operation. In some examples, the base station may configure periodic or semi-periodic uplink and downlink resources that may overlap in time, and may dynamically indicate, to the UE, whether the overlapping uplink and downlink resources are scheduled for a full duplex operation.

A method of wireless communications at a UE is described. The method may include receiving DCI including an indication of a full duplex operation between the UE and a base station, where the DCI contains or references an uplink grant corresponding to an uplink transmission of the full duplex operation and a downlink grant corresponding to a downlink transmission of the full duplex operation, performing the uplink transmission of the full duplex operation based on the DCI and the uplink grant, and receiving the downlink transmission of the full duplex operation based on the DCI and the downlink grant, where the uplink transmission and the downlink transmission at least partially overlap in time.

An apparatus for wireless communications at a UE is described. The apparatus may include a processor, memory coupled with the processor, and instructions stored in the memory. The instructions may be executable by the processor to cause the apparatus to receive DCI including an indication of a full duplex operation between the UE and a base station, where the DCI contains or references an uplink grant corresponding to an uplink transmission of the full duplex operation and a downlink grant corresponding to a downlink transmission of the full duplex operation, perform the uplink transmission of the full duplex operation based on the DCI and the uplink grant, and receive the downlink transmission of the full duplex operation based on the DCI and the downlink grant, where the uplink transmission and the downlink transmission at least partially overlap in time.

Another apparatus for wireless communications at a UE is described. The apparatus may include means for receiving DCI including an indication of a full duplex operation between the UE and a base station, where the DCI contains or references an uplink grant corresponding to an uplink transmission of the full duplex operation and a downlink grant corresponding to a downlink transmission of the full duplex operation, performing the uplink transmission of the full duplex operation based on the DCI and the uplink grant, and receiving the downlink transmission of the full duplex operation based on the DCI and the downlink grant, where the uplink transmission and the downlink transmission at least partially overlap in time.

A non-transitory computer-readable medium storing code for wireless communications at a UE is described. The code may include instructions executable by a processor to receive DCI including an indication of a full duplex operation between the UE and a base station, where the DCI contains or references an uplink grant corresponding to an uplink transmission of the full duplex operation and a downlink grant corresponding to a downlink transmission of the full duplex operation, perform the uplink transmission of the full duplex operation based on the DCI and the uplink grant, and receive the downlink transmission of the full duplex operation based on the DCI and the downlink grant, where the uplink transmission and the downlink transmission at least partially overlap in time.

In some examples of the method, apparatuses, and non-transitory computer-readable medium described herein, receiving the DCI may include operations, features, means, or instructions for receiving a first DCI message including the uplink grant and the downlink grant, the first DCI message including one or more dedicated uplink fields including information associated with the uplink grant, one or more dedicated downlink fields including information associated with the downlink grant, and one or more shared fields including information associated with both the uplink grant and the downlink grant.

Some examples of the method, apparatuses, and non-transitory computer-readable medium described herein may further include operations, features, means, or instructions for identifying a radio network temporary identifier associated with a first type of DCI message, where the first DCI message may be the first type of DCI message, and decoding the first DCI message based on the identified radio network temporary identifier.

Some examples of the method, apparatuses, and non-transitory computer-readable medium described herein may further include operations, features, means, or instructions for receiving, from the base station, an indication of the radio network temporary identifier, where identifying the radio network temporary identifier may be based on receiving the indication of the radio network temporary identifier.

Some examples of the method, apparatuses, and non-transitory computer-readable medium described herein may further include operations, features, means, or instructions for identifying a cell radio network temporary identifier associated with the first DCI message, determining that a size of the first DCI message may be different from a size of a second DCI associated with the cell radio network temporary identifier, and decoding the first DCI message based on the cell radio network temporary identifier and the determining that the size of the first DCI message may be different from the size of the second DCI.

Some examples of the method, apparatuses, and non-transitory computer-readable medium described herein may further include operations, features, means, or instructions for operating in a full duplex mode on an operating band where at least a first subband may be allocated for uplink communications and at least a second subband may be allocated for downlink communications, where a frequency domain resource assignment (FDRA) field may be shared between the uplink grant and the downlink grant, and the uplink transmission and the downlink transmission may be within resource blocks indicated by the FDRA field that overlap with the first subband, the second subband, respectively.

Some examples of the method, apparatuses, and non-transitory computer-readable medium described herein may further include operations, features, means, or instructions for identifying, in the one or more shared fields, an indication of a single time domain resource assignment identifier associated with both the uplink grant and the downlink grant.

In some examples of the method, apparatuses, and non-transitory computer-readable medium described herein, the first DCI may be configured to schedule no more uplink transmissions than the first uplink transmission and no more downlink transmissions than the first downlink transmission.

Some examples of the method, apparatuses, and non-transitory computer-readable medium described herein may further include operations, features, means, or instructions for receiving, from the base station, configuration information tables for the one or more shared DCI fields associated with the full duplex operation, and identifying scheduling information for both the uplink grant and the downlink grant in the one or more shared fields of the first DCI message based on receiving the first DCI message and the configuration information tables.

In some examples of the method, apparatuses, and non-transitory computer-readable medium described herein, the configuration information tables may be provided in a radio resource control message, a media access control (MAC) control element (CE), or a combination thereof.

In some examples of the method, apparatuses, and non-transitory computer-readable medium described herein, receiving the DCI may include operations, features, means, or instructions for receiving a first-stage DCI message, and receiving, based on receiving the first-stage DCI message, a first second-stage DCI message and a second second-stage DCI message.

In some examples of the method, apparatuses, and non-transitory computer-readable medium described herein, the first-stage DCI message includes an indication of resources on which to receive the first second-stage DCI message and the second second-stage DCI message, and where the first second-stage DCI message includes the uplink grant and where the second second-stage DCI message includes the downlink grant.

Some examples of the method, apparatuses, and non-transitory computer-readable medium described herein may further include operations, features, means, or instructions for identifying, based on receiving the first-stage DCI message, a set of one or more physical downlink control channel (PDCCH) candidates, one or more aggregation levels, one or more search space set occasions, or a combination thereof, and performing one or more blind decoding procedures on the one or more PDCCH candidates based on the set of one or more PDCCH candidates, the one or more aggregation levels, the one or more search space set occasions, or any combination thereof, where receiving the first second-stage DCI message and the second second-stage DCI message may be based on performing the one or more blind decoding procedures.

Some examples of the method, apparatuses, and non-transitory computer-readable medium described herein may further include operations, features, means, or instructions for identifying, based on receiving the first-stage DCI message, time domain resource assignment information for the uplink transmission and the downlink transmission, where the time domain resource assignment information includes an indication of one or more symbols assigned to the uplink transmission and the downlink transmission, respectively, and configuring one or more transmit antennas, one or more transmit beams, one or more receive antennas, one or more receive beams, or a combination thereof, for switching operations between a half duplex operation and the full duplex operation according to the time domain resource assignment information.

Some examples of the method, apparatuses, and non-transitory computer-readable medium described herein may further include operations, features, means, or instructions for identifying, based on receiving the first-stage DCI message, time resources, frequency resources, or both for transmitting an acknowledgment message associated with the first-stage DCI message, and transmitting the acknowledgement message on the identified time resources, frequency resources, or both.

Some examples of the method, apparatuses, and non-transitory computer-readable medium described herein may further include operations, features, means, or instructions for receiving, from the base station, configuration information indicating periodic or semi-periodic uplink transmission occasions and periodic or semi-periodic downlink transmission occasions, where at least one of the uplink transmission occasions overlaps in time with at least one of the downlink transmission occasions.

In some examples of the method, apparatuses, and non-transitory computer-readable medium described herein, receiving the DCI may include operations, features, means, or instructions for receiving a first DCI message including one or more parameters for the uplink transmission in one of the periodic or semi-periodic uplink transmission occasions subsequent to receiving the DCI, one or more parameters the uplink transmission in one of the periodic or semi-periodic uplink transmission occasions subsequent to receiving the DCI, or both.

In some examples of the method, apparatuses, and non-transitory computer-readable medium described herein, the updated parameters include a power control, a modulation and coding scheme, a transmission configuration indicator (TCI) state, or a combination thereof.

In some examples of the method, apparatuses, and non-transitory computer-readable medium described herein, receiving the DCI may include operations, features, means, or instructions for receiving a first DCI message including an indication that the uplink transmission may be scheduled in one of the uplink transmission occasions and the downlink transmission may be scheduled in one of the downlink transmission occasions and the uplink transmission overlaps with the downlink transmission, or an indication that the full duplex operation may be configured for the at least one of the uplink transmission occasions and the at least one of the downlink transmission occasions.

Some examples of the method, apparatuses, and non-transitory computer-readable medium described herein may further include operations, features, means, or instructions for determining one or more parameters for the uplink transmission and the downlink transmission, based on the indication that the full duplex operation may be configured.

In some examples of the method, apparatuses, and non-transitory computer-readable medium described herein, the one or more parameters include power control, a modulation and coding scheme, a TCI state, or a combination thereof.

Some examples of the method, apparatuses, and non-transitory computer-readable medium described herein may further include operations, features, means, or instructions for identifying, based on receiving the first DCI message, time resources, frequency resources, or both for transmitting an acknowledgment message associated with the first DCI message, and transmitting the acknowledgement message on the identified time resources, frequency resources, or both.

A method of wireless communications at a base station is described. The method may include transmitting, to a UE DCI including an indication of a full duplex operation between the UE and the base station, where the DCI contains or references an uplink grant corresponding to an uplink transmission of the full duplex operation and a downlink grant corresponding to a downlink transmission of the full duplex operation, receiving the uplink transmission of the full duplex operation based on the DCI and the uplink grant, and performing the downlink transmission of the full duplex operation based on the DCI and the downlink grant, where the uplink transmission and the downlink transmission at least partially overlap in time.

An apparatus for wireless communications at a base station is described. The apparatus may include a processor, memory coupled with the processor, and instructions stored in the memory. The instructions may be executable by the processor to cause the apparatus to transmit, to a UE DCI including an indication of a full duplex operation between the UE and the base station, where the DCI contains or references an uplink grant corresponding to an uplink transmission of the full duplex operation and a downlink grant corresponding to a downlink transmission of the full duplex operation, receive the uplink transmission of the full duplex operation based on the DCI and the uplink grant, and perform the downlink transmission of the full duplex operation based on the DCI and the downlink grant, where the uplink transmission and the downlink transmission at least partially overlap in time.

Another apparatus for wireless communications at a base station is described. The apparatus may include means for transmitting, to a UE DCI including an indication of a full duplex operation between the UE and the base station, where the DCI contains or references an uplink grant corresponding to an uplink transmission of the full duplex operation and a downlink grant corresponding to a downlink transmission of the full duplex operation, receiving the uplink transmission of the full duplex operation based on the DCI and the uplink grant, and performing the downlink transmission of the full duplex operation based on the DCI and the downlink grant, where the uplink transmission and the downlink transmission at least partially overlap in time.

A non-transitory computer-readable medium storing code for wireless communications at a base station is described. The code may include instructions executable by a processor to transmit, to a UE DCI including an indication of a full duplex operation between the UE and the base station, where the DCI contains or references an uplink grant corresponding to an uplink transmission of the full duplex operation and a downlink grant corresponding to a downlink transmission of the full duplex operation, receive the uplink transmission of the full duplex operation based on the DCI and the uplink grant, and perform the downlink transmission of the full duplex operation based on the DCI and the downlink grant, where the uplink transmission and the downlink transmission at least partially overlap in time.

In some examples of the method, apparatuses, and non-transitory computer-readable medium described herein, transmitting the DCI may include operations, features, means, or instructions for transmitting a first DCI message including the uplink grant and the downlink grant, the first DCI message including one or more dedicated uplink fields including information associated with the uplink grant, one or more dedicated downlink fields including information associated with the downlink grant, and one or more shared fields including information associated with both the uplink grant and the downlink grant.

Some examples of the method, apparatuses, and non-transitory computer-readable medium described herein may further include operations, features, means, or instructions for transmitting, to the UE, an indication of a radio network temporary identifier associated with a first type of DCI message, where the first DCI message may be the first type of DCI message.

In some examples of the method, apparatuses, and non-transitory computer-readable medium described herein both the uplink grant and the downlink grant indicate resources that at least partially overlap with a first subband of an operating band, a second subband of an operating band, or both, where the first subbband may be allocated for uplink communications, and the second subband may be allocated for downlink communications.

Some examples of the method, apparatuses, and non-transitory computer-readable medium described herein may further include operations, features, means, or instructions for including, in the one or more shared fields, an indication of a single time domain resource assignment identifier associated with both the uplink grant and the downlink grant.

In some examples of the method, apparatuses, and non-transitory computer-readable medium described herein, the first DCI may be configured to schedule no more uplink transmissions than the first uplink transmission and no more downlink transmissions than the first downlink transmission.

Some examples of the method, apparatuses, and non-transitory computer-readable medium described herein may further include operations, features, means, or instructions for transmitting, to the UE, configuration information tables for the one or more shared DCI fields associated with the full duplex operation.

In some examples of the method, apparatuses, and non-transitory computer-readable medium described herein, the configuration information tables may be provided in a radio resource control message, a MAC-CE, or a combination thereof.

In some examples of the method, apparatuses, and non-transitory computer-readable medium described herein, transmitting the DCI may include operations, features, means, or instructions for transmitting a first-stage DCI message, and transmitting, based on transmitting the first-stage DCI message, a first second-stage DCI message and a second second-stage DCI message.

In some examples of the method, apparatuses, and non-transitory computer-readable medium described herein, the first-stage DCI message includes an indication of resources on which to receive the first second-stage DCI message and the second second-stage DCI message, and where the first second-stage DCI message includes the uplink grant and where the second second-stage DCI message includes the downlink grant.

Some examples of the method, apparatuses, and non-transitory computer-readable medium described herein may further include operations, features, means, or instructions for including, in the first-stage DCI message, an indication of a set of one or more PDCCH candidates, one or more aggregation levels, one or more search space set occasions, or a combination thereof.

In some examples of the method, apparatuses, and non-transitory computer-readable medium described herein the first-stage DCI message includes time domain resource assignment information for the uplink transmission and the downlink transmission, where the time domain resource assignment information includes an indication of one or more symbols assigned to the uplink transmission and the downlink transmission, respectively, and where receiving the uplink transmission and performing the downlink transmission may be based on the time domain resource assignment information.

Some examples of the method, apparatuses, and non-transitory computer-readable medium described herein may further include operations, features, means, or instructions for including, in the first-stage DCI message, an indication of time resources, frequency resources, or both for transmitting an acknowledgment message associated with the first-stage DCI message, and receiving the acknowledgement message over the indicated time resources, frequency resources, or both.

Some examples of the method, apparatuses, and non-transitory computer-readable medium described herein may further include operations, features, means, or instructions for transmitting, to the UE, configuration information indicating periodic or semi-periodic uplink transmission occasions and periodic or semi-periodic downlink transmission occasions, where at least one of the uplink transmission occasions overlaps in time with at least one of the downlink transmission occasions.

In some examples of the method, apparatuses, and non-transitory computer-readable medium described herein, transmitting the DCI may include operations, features, means, or instructions for transmitting a first DCI message including one or more parameters for the uplink transmission in one of the periodic or semi-periodic uplink transmission occasions subsequent to receiving the DCI, one or more parameters the uplink transmission in one of the periodic or semi-periodic uplink transmission occasions subsequent to receiving the DCI, or both.

In some examples of the method, apparatuses, and non-transitory computer-readable medium described herein, the updated parameters include a power control, a modulation and coding scheme, a TCI state, or a combination thereof.

In some examples of the method, apparatuses, and non-transitory computer-readable medium described herein, transmitting the DCI may include operations, features, means, or instructions for transmitting a first DCI message including an indication that the uplink transmission may be scheduled in one of the uplink transmission occasions and the downlink transmission may be scheduled in one of the downlink transmission occasions and the uplink transmission overlaps with the downlink transmission, or an indication that the full duplex operation may be configured for the at least one of the uplink transmission occasions and the at least one of the downlink transmission occasions.

In some examples of the method, apparatuses, and non-transitory computer-readable medium described herein, one or more parameters for the uplink transmission and the downlink transmission may be associated with the full duplex operation, the one or more parameters including power control, a modulation and coding scheme, a TCI state, or a combination thereof.

Some examples of the method, apparatuses, and non-transitory computer-readable medium described herein may further include operations, features, means, or instructions for including, in the first DCI message, an indication of time resources, frequency resources, or both, for transmitting an acknowledgment message associated with the first DCI message, and receiving the acknowledgement message over the indicated time resources, frequency resources, or both.

DETAILED DESCRIPTION

Figure 1:
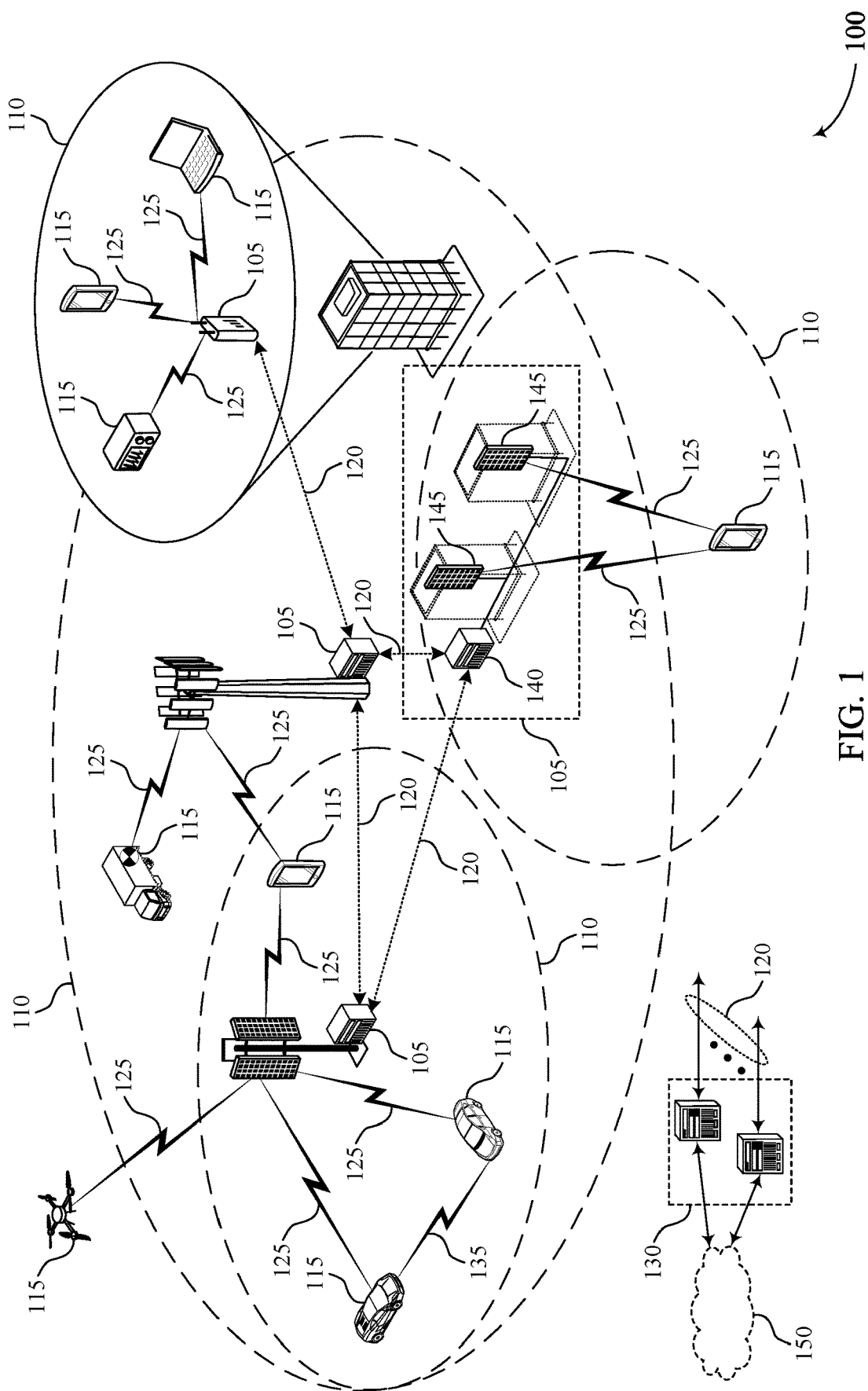
FIG. 1 illustrates an example of a system for wireless communications that supports control channel designs for dynamic full duplex enabling in accordance with aspects of the present disclosure.

Some wireless communications systems may support full duplex operations (e.g., in which a user equipment (UE) is capable of simultaneously transmitting and receiving). A base station may schedule full duplex operations (e.g., uplink and downlink transmissions that overlap in time) using downlink control information (DCI) messages. For instance, the base station may transmit a first DCI (e.g., a legacy DCI) scheduling an uplink transmission, and may transmit a second DCI (e.g., a legacy DCI) scheduling a downlink transmission that overlaps in time with the uplink transmission. To perform the full duplex operation, the UE may adjust one or more parameters to process the overlapping uplink and downlink transmissions. Such parameters may include modulation and coding scheme (MCS) tables, transmission configuration indicator (TCI) states, beam configurations or assumptions, power control parameters, system information (SI) and cross-link interference (CLI) measurement, puncturing or rate matching around demodulation reference signals (DMRS), uplink timing advance (TA) values, or the like. The parameters may be set differently for half duplex operations and full duplex operations. Thus, if a UE fails to receive or decode one of the two DCIs, then the UE will not only fail to receive or transmit the transmission associated with the failed DCI, but may also transmit or receive the other overlapping transmission by selecting the wrong parameters. For instance, the UE may falsely assume that it can rely on uplink/downlink beam correspondence, and may select the wrong beams for an uplink or downlink transmission. This may result in multiple failed transmissions or retransmissions, increased system congestion, increased system latency, and decreased user experience.

A base station may dynamically and reliably indicate that pending transmissions are part of a full duplex operation via DCI designs described herein. For example, a base station may transmit a small DCI including no more than one downlink grant and no more than one uplink grant for a full duplex operation. In some examples, the base station may transmit a first-stage DCI including partial information, and second-stage DCIs including full uplink and downlink grants for a full duplex operation. In some examples, the base station may configure periodic or semi-periodic uplink and downlink resources that may overlap in time, and may dynamically indicate whether the overlapping uplink and downlink resources are scheduled for a full duplex operation.

In some examples, a base station may transmit a single DCI that schedules one uplink grant and one downlink grant for a full duplex operation. By limiting the number of grants included in the single DCI, the size of the DCI can be limited for increased likelihood of successful decoding. The DCI may include uplink dedicated fields, downlink dedicated fields, and shared fields for condensed signaling. In some cases, the UE may use radio resource control (RRC) or media access control (MAC) configured tables for decoding information (that applies to both the uplink transmission and the downlink transmission) in the shared fields.

In a second proposal, the base station may transmit a first-stage DCI containing partial information and multiple second-stage DCIs containing additional (e.g., more detailed) information for the uplink and downlink transmission. For instance, the first-stage DCI may include resource allocation information for the second-stage DCIs. The UE may easily decode the smaller first-stage DCI, may determine that a full-duplex operation is pending, and may further determine which resources to monitor to receive the second-stage DCIs (which may include the uplink and downlink grants). In some examples, the first-stage DCI may include time-domain resource allocation (TDRA) information for the uplink and downlink transmissions such that the UE can prepare to switch back and forth between full duplex operations and half duplex operations. The UE may then perform one or more blind decode procedures on physical uplink control channel (PUCCH) candidates to receive the rest of the uplink and downlink grants (e.g. frequency resource information, etc.).

In a third proposal, the base station may configure periodic or semi-periodic resources for uplink and downlink transmissions, that may overlap in time. The base station may dynamically indicate whether the overlapping uplink and downlink resources are configured for a full-duplex operation. For instance, a two-bit indication in the DCI may indicate whether actual transmissions are scheduled for the uplink resources and the downlink resources (e.g., one bit for a physical uplink shared channel (PUSCH) and one bit for a physical downlink shared channel (PDSCH)). Or, a one-bit indication in the DCI may indicate whether the full duplex operation is scheduled for overlapping uplink and downlink resources.

Particular aspects of the subject matter described herein may be implemented to realize one or more advantages. The described techniques may support improvements in system efficiency such that a UE is more likely to successfully decode DCI and accurately identify whether a full duplex operation or a half duplex operation is scheduled. Such improved accuratly in determining an operation type may allow the UE to more accurately select transmission or reception parameters, resulting in increased likelihood of successful transmissions, decreased retransmissions and failed transmissions, improved system efficiency, decreased system latency, and improved user experience.

Aspects of the disclosure are initially described in the context of wireless communications systems and timelines. Aspects of the disclosure are further illustrated by and described with reference to apparatus diagrams, system diagrams, and flowcharts that relate to control channel designs for dynamic full duplex enabling.

FIG. 1 illustrates an example of a wireless communications system 100 that supports control channel designs for dynamic full duplex enabling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of one or more radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of one or more carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of one or more of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of one or more subcarriers or resource blocks (RBs)) within a carrier, within a guardband of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2A:
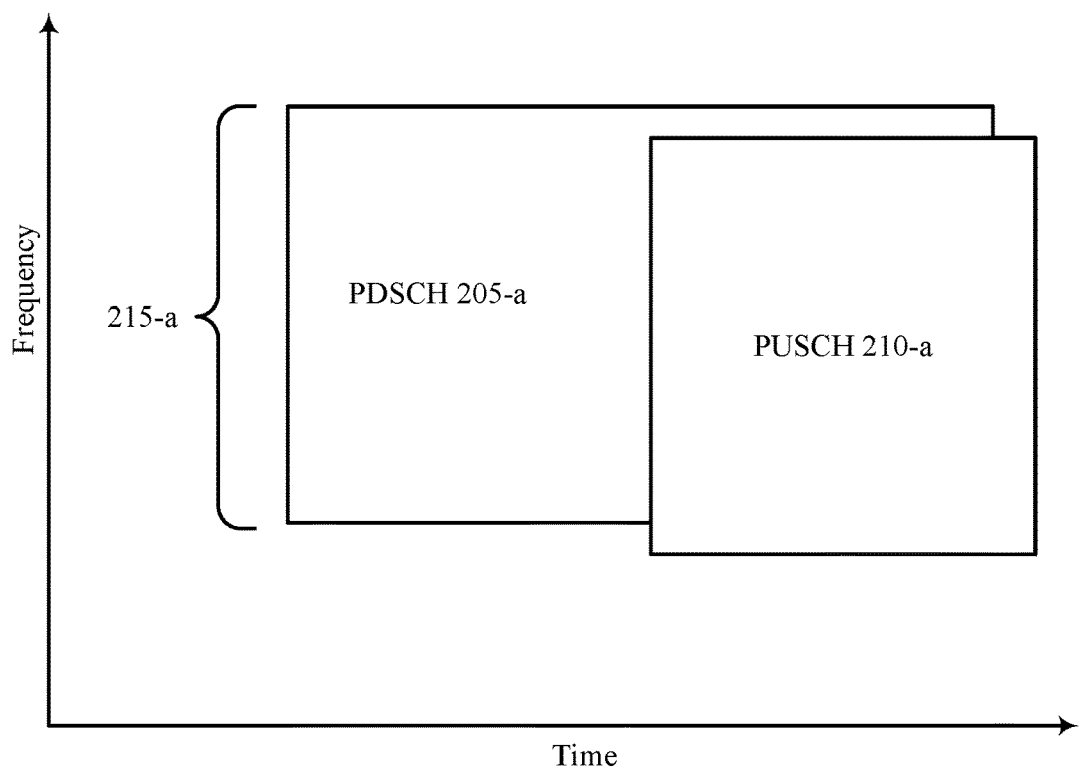
FIG. 2A illustrates an example of a full duplex scenario that supports control channel designs for dynamic full duplex enabling in accordance with aspects of the present disclosure.
Figure 2B:
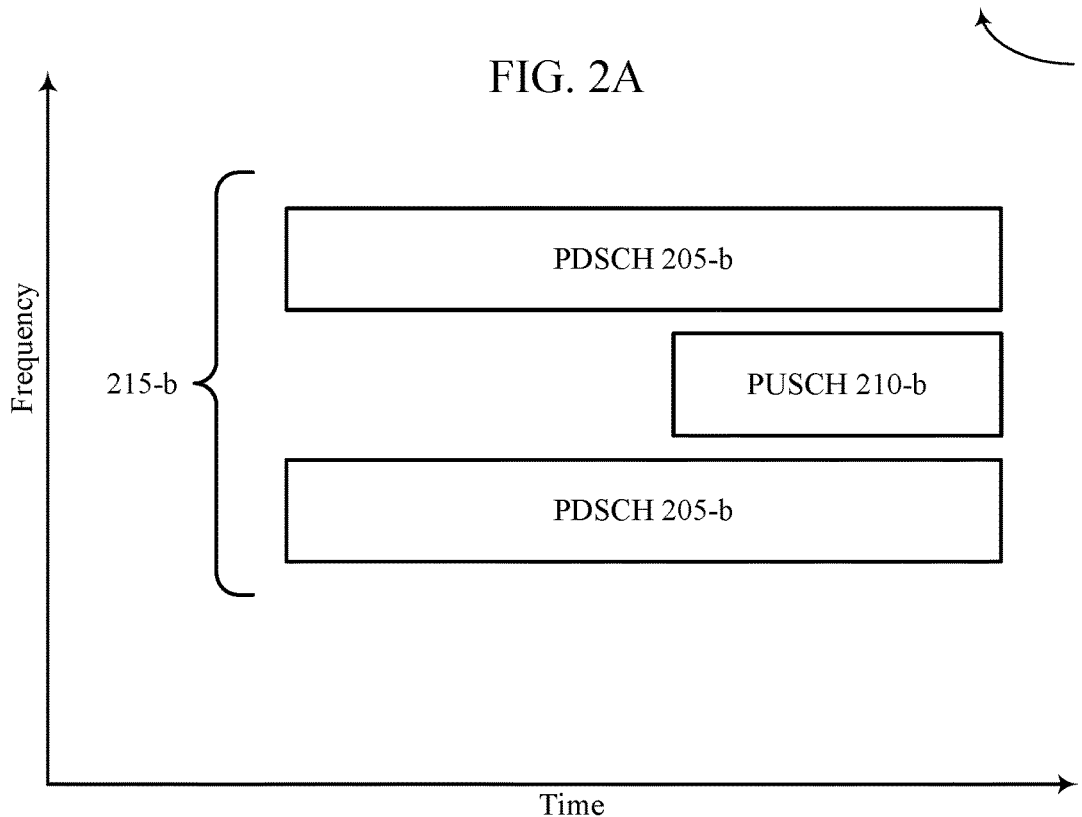
FIG. 2B illustrates an example of a full duplex scenario that supports control channel designs for dynamic full duplex enabling in accordance with aspects of the present disclosure.

A base station 105 may dynamically and reliably indicate that pending transmissions are part of a full duplex operation via DCI designs described herein. For example, a base station 105 may transmit, to a UE 115, a DCI including no more than one downlink grant and no more than one uplink grant for a full duplex operation. In some examples, the base station 105 may transmit a first-stage DCI including partial information, and second-stage DCIs including full uplink and downlink grants for a full duplex operation. In some examples, the base station 105 may configure periodic or semi-periodic uplink and downlink resources that may overlap in time, and may dynamically indicate, to the UE 115, whether the overlapping uplink and downlink resources are scheduled for a full duplex operation FIGS. 2A and 2B illustrate examples of full duplex scenarios 200 and 201 that support control channel designs for dynamic full duplex enabling in accordance with aspects of the present disclosure. In some examples, full duplex scenarios 200 and 201 may implement aspects of wireless communications system 100. For instance, a base station 105 and a UE 115 may communicate in accordance with full duplex scenarios 200 and 201

In some examples, a UE 115 may support full duplex operations. In a full duplex operation, a UE 115 may simultaneously receive downlink transmissions and perform uplink transmissions during one or more symbols that support full duplex transmissions. Full duplex operation may be based on receiving DCI that triggers uplink transmissions and downlink transmissions.

In some examples, UE 115 may support full band full duplex operations, as illustrated with reference to FIG. 2A. Base station 105 may schedule, via a DCI message including a downlink grant, downlink data transmissions on PDSCH 205-a. PDSCH 205-a may span some or all of a frequency band 215-a. In some examples, base station 105 may also schedule, via a second DCI message including an uplink grant, uplink data transmissions on PUSCH 210-a. In some examples, PUSCH 210-a may span some or all of the frequency band 215-a. Thus, for at least some symbol periods, PUSCH 210-a and PDSCH 205-a may overlap in time.

In some examples, UE 115 may support subband full duplex operations, as illustrated with reference to FIG. 2B. Base station 105 may schedule, via one or more DCI messages including one or more downlink grants, a first portion of PDSCH 205-b on a first subband and a second portion of PDSCH 205-b on a second subband of band 215-b. Additionally, base station 105 may schedule, via another DCI message including an uplink grant, a PUSCH 210-b on a third subband of band 215-b. Thus, PUSCH 210-b may overlap in time for a number of symbol periods with PDSCH 205-b.

In some examples, UE 115 may fail to decode a DCI, and may erroneously prepare for a half duplex operation when a full duplex operation is scheduled. Base station 105 may transmit a first DCI scheduling a PDSCH 205 and a second DCI scheduling a PUSCH 210 that at least partially overlaps in time with PDSCH 205. If UE 115 receives and successfully decodes both the first DCI and the second DCI, then UE 115 may prepare to perform a full duplex operation based on an overlapping portion of PDSCH 205 and PUSCH 210. However, if UE 115 only receives one of the DCIs, then UE 115 may erroneously determine that a half duplex operation is scheduled (either a transmission on PUSCH 210 or a reception on PDSCH 205, but not both at the same time). UE 115 may communicate with base station 105 using different parameters for a half duplex operation than it uses for a full duplex operation. Such parameters may include MCS tables, TCI states, power control parameters, system information (SI) measurements, CLI measurements, puncturing or rate matching around DMRSs, uplink timing advance values, beam indices or beam correspondence values, or the like. Thus, if UE 115 receives only one DCI and fails to decode the other DCI, then UE 115 may assume it is configured to perform a half duplex operation. It may prepare to perform uplink transmission on PUSCH 210-b, or prepare to receive a downlink transmission on PDSCH 205 using the half duplex parameters (instead of the full duplex parameters). In such cases, UE 115 may fail to decode the scheduled downlink transmission or base station 105 may fail to receive the scheduled uplink transmissions based on the UE using the wrong parameters.

For example, in a half duplex operation, UE 115 may appropriately assume uplink/downlink beam correspondence and may select transmit beams or receive beams accordingly. However, in a full duplex operation, UE 115 may not assume uplink/downlink beam correspondence. Base station 105 may determine its receive beam or transmit beam according to whether UE 115 is configured for full duplex operation or half duplex operation. However, if UE 115 misses either the first DCI or the second DCI, then UE 115 may assume it uplink/downlink beam correspondence and select a beam based on the assumption, while base station 105 assumes that UE 115 cannot rely on uplink/downlink beam correspondence in a full duplex mode and may select a beam based on that assumption. Based on the mismatch of assumptions, UE 115 and base station 105 may select mismatched beams and may fail to receive uplink or downlink communications. Thus, if scheduling DCIs for overlapping downlink and uplink transmissions are missed, or are not easily decodable, then transmissions may fail, latency may increase, and user experience may suffer.

In some examples, as described herein, base station 105 may dynamically schedule full duplex operations using DCIs that indicate the full duplex operations. For instance, base station 105 may schedule overlapping uplink and downlink transmissions using a single DCI that includes downlink dedicated fields, uplink dedicated fields, and shared fields for both uplink and downlink transmissions, as illustrated with reference to FIG. 3. In some examples, base station 105 may schedule overlapping uplink and downlink transmissions using a first-stage DCI and a set of one or more second-stage DCIs, as described in greater detail with reference to FIGS. 4 and 5. The first-stage DCI may include an indication of resources in which to receive second-stage DCIs, or may include an indication of time domain resources of the uplink and downlink transmission so that UE 115 may prepare antenna arrays, transceivers, or the like, to switch between half duplex operations and full duplex operations. In some examples, base station 105 may configure periodic or semi-periodic uplink resources and downlink resources, as described in greater detail with reference to FIGS. 6 and 7. Base station 105 may transmit a DCI indicating whether overlapping uplink and downlink resources configured for full duplex operations.

Figure 3:
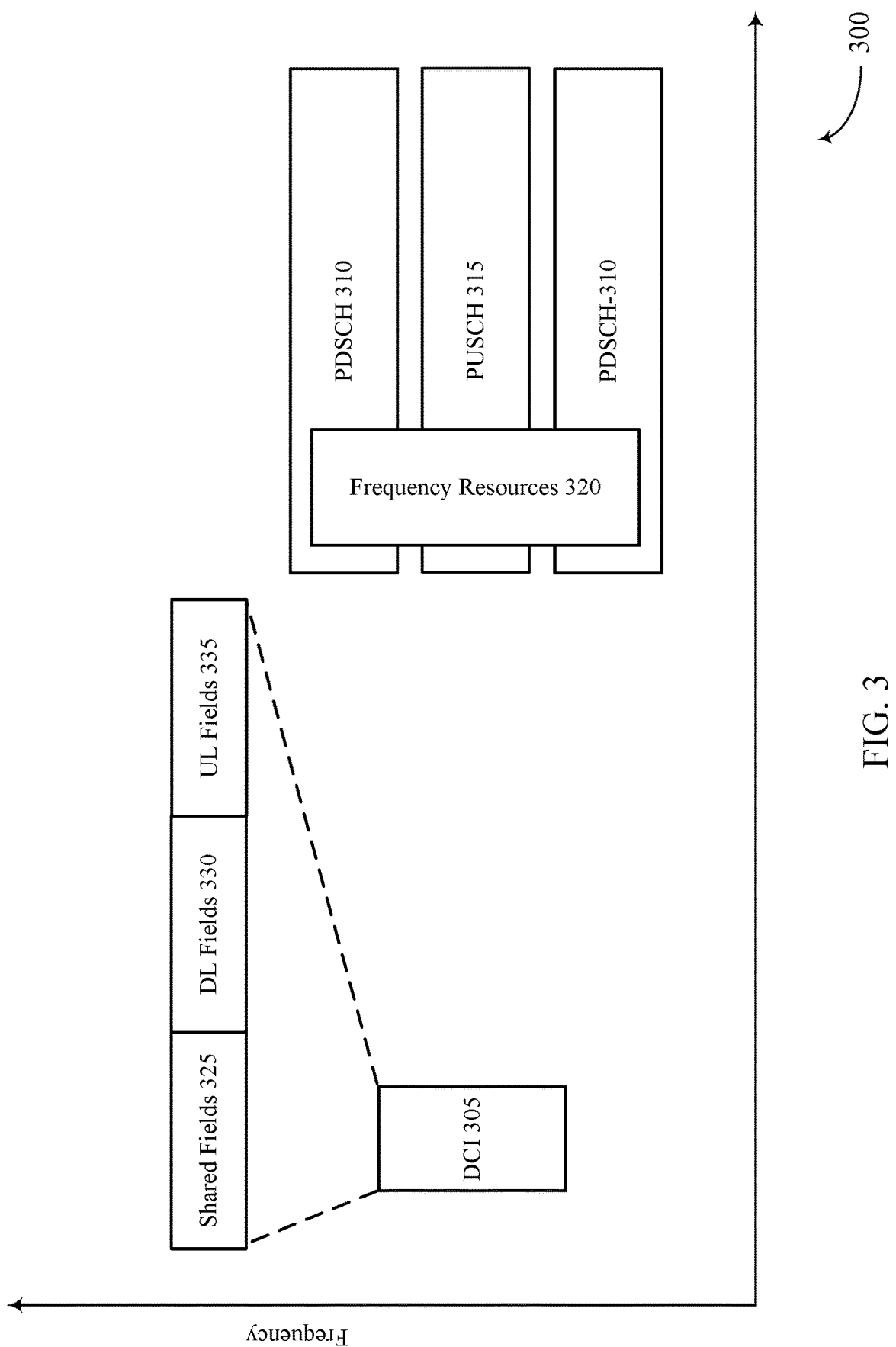
FIG. 3 illustrates an example of a timeline that supports control channel designs for dynamic full duplex enabling in accordance with aspects of the present disclosure.

FIG. 3 illustrates an example of a timeline 300 that supports control channel designs for dynamic full duplex enabling in accordance with aspects of the present disclosure. In some examples, timeline 300 may implement aspects of wireless communications system 100. For example, a base station 105 and a UE 115 may communicate according to timeline 300.

In some examples, a UE may schedule an uplink transmission and a downlink transmission using a single first-stage DCI. For example, base station 105 may transmit a DCI 305 to allocate one or more resources of PDSCHs 310 and PUSCHs 315 (e.g., frequency resources 320) for a full duplex operation. In some examples, a first portion of PDSCH 310 may be located on a first subband and a second portion of PDSCH 310 may be located on a second subband (e.g., where PUSCH 315 is located in between first and second portions of PDSCH 310). DCI 305 may include an uplink grant for an uplink transmission on frequency resources 320, and a downlink grant for a downlink transmission on frequency resources 320. Frequency resources 320 may overlap with some or all of PDSCH 310 and PUSCH 315 of a band. In some examples frequency resources 320 may be resource blocks allocated by DCI 305 in a symbol.

In some examples, DCI 305 may be associated with a radio network temporary identifier (RNTI) specific to such DCIs. That is, DCI 305 may have a unique design, a unique size, or both, for scheduling full duplex operations. DCI 305 may therefore be associated with a unique RNTI for identifying and decoding DCI 305. In some examples, base station 105 may transmit an indication of the RNTI for DCI 305 to UE 115. UE 115 may use the RNTI for decoding DCI 305 and determining that a full duplex operation is scheduled on frequency resources 320.

In some examples, DCI 305 may be associated with a cell RNTI (C-RNTI) associated with UE 115 allocated by base station 105. In such examples, UE 115 may rely on a size difference between DCI 305 and other DCIs (e.g., for half duplex operations) to decode DCI 305. For instance, DCI 305 may be a different size (e.g., may be larger) than other DCI messages. DCI 305 may be constrained to schedule no more than one uplink transmission and one downlink transmission on frequency resources 320. Such constraints may decrease the size of DCI 305 (e.g., with respect to scheduling multiple uplink transmissions or multiple downlink transmissions) to increase the likelihood that UE 115 will successfully decode DCI 305 and successfully perform the full duplex operation. Thus, UE 115 may utilize multiple size-hypotheses when decoding a DCI based on the C-RNTI. That is, UE 115 may assume that DCI 305 is a smaller DCI and may attempt to decode it using the C-RNTI. If the decoding is unsuccessful (e.g., if UE 115 does not achieve a cyclic redundancy check (CRC) pass), then UE 115 may attempt to decode DCI 305 based on the assumption that DCI 305 is larger using the C-RNTI. If the decoding is successful (e.g., if UE 115 achieves a CRC pass), then UE 115 may correctly identify and prepare for the full duplex operation.

DCI 305 may include multiple fields. For example, DCI 305 may include one or more downlink fields 330 that include information for a downlink transmission on frequency resources 320. Downlink fields 330 may include parameters specific to the downlink transmission, such as TCI states. DCI 305 may also include one or more uplink fields 335 that include information for an uplink transmission on frequency resources 320. For instance, uplink fields 335 may include parameters specific to the uplink transmission, such as power control. DCI 305 may also include shared fields 325, which may include information for both the uplink transmission and the downlink transmission. Shared fields 325 may include one or more parameters that are useable for both the uplink transmission and the downlink transmission. For instance, both the uplink transmission and the downlink transmission on frequency resources 320 may utilize overlapping, similar, or the same frequency resources. Thus, shared fields 325 may include an indication of frequency domain resource assignment (FDRA) information (e.g., instead of a first FDRA indication for the uplink transmission and a second FDRA indication, which may be the same as the first FDRA indication, for the downlink transmissions). For instance, shared fields 325 may include a single bandwidth part (BWP) index indicating a BWP for both the uplink transmission and the downlink transmission. In some examples (e.g., where subband full duplex (SBFD) functionality is utilized), one FDRA may be used for an entire uplink and downlink bandwidth (e.g., the full frequency range of frequency resources 320). Similarly, the uplink transmission and the downlink transmission may overlap partially or completely in time. Thus, shared fields 325 may include a single indication of time domain resource allocation (TDRA) information for both the uplink transmission and the downlink transmission (e.g., instead of a first TDRA indication for the uplink transmission and a second TDRA indication, which may be the same as the first TDRA indication, for the downlink transmissions). In some examples, allocated frequency resources of the uplink transmission and allocated frequency resources of the downlink transmission may not overlap (e.g., SBFD). In such examples, as indicated by the FDRA field and the uplink downlink bandwidth in a symbol, UE 115 may transmit and receive during the overlapping portion between resource allocated by the FDRA field and the pre-configured uplink/downlink bandwidth in the indicated symbols.

Use of shared fields 325 may make the signaling more compact, allowing for a smaller size for DCI 305 and improved likelihood that UE 115 will be able to successfully receive and decode DCI 305. In some examples, DCI 305 may utilize fields previously utilized for scheduling two uplink transmissions or two downlink transmissions to schedule both an uplink transmission and a downlink transmission. In some cases, DCI 305 may not include a newly defined or dedicated full duplex flag because DCI formats may already indicate full duplex scheduling.

In some examples, UE 115 may decode shared fields 325 based on one or more tables. For instance, base station 105 may configure (e.g., via higher layer singling such as RRC signaling, a media access control (MAC) signaling, or a combination thereof) one or more tables specific to the shared fields 325. The tables may include entries for information specific to both uplink and downlink transmissions. Shared fields 325 may include one or more values indicating indices on the configured table or tables. UE 115 may decode shared fields 325 using one table, and downlink fields 330 and uplink fields 335 using one or more separate tables.

In some examples, UE 115 may transmit and receive, as part of the full duplex operation, on frequency resources 320 for the full duplex operation. In some examples, frequency resources 320 allocated by DCI 305 for the full duplex operation may overlap with one or more frequency gaps between PDSCHs 310 and PUSCH 315. For instance, there may be a guard period in the frequency domain between PDSCH 310 (e.g., on a first subband) and PUSCH 315 (e.g., on a second subband), and another guard period in the frequency domain between PUSCH 315 and PDSCH 310 (e.g., on a third subband). In such examples, UE 115 may ignore frequency resources 320 that overlap with the guard periods. That is, although the FDRA information in shared fields 325 may span the full frequency range of frequency resources 320, UE 115 may ignore (e.g., may refrain from transmitting or receiving) portions of frequency resources 320 that overlap with the guard periods between PDSCH 310 and PUSCH 315.

Design information for DCI 305 may be standardized, preconfigured, signaled by base station 105, or otherwise known to UE 115 and base station 105.

Figure 4:
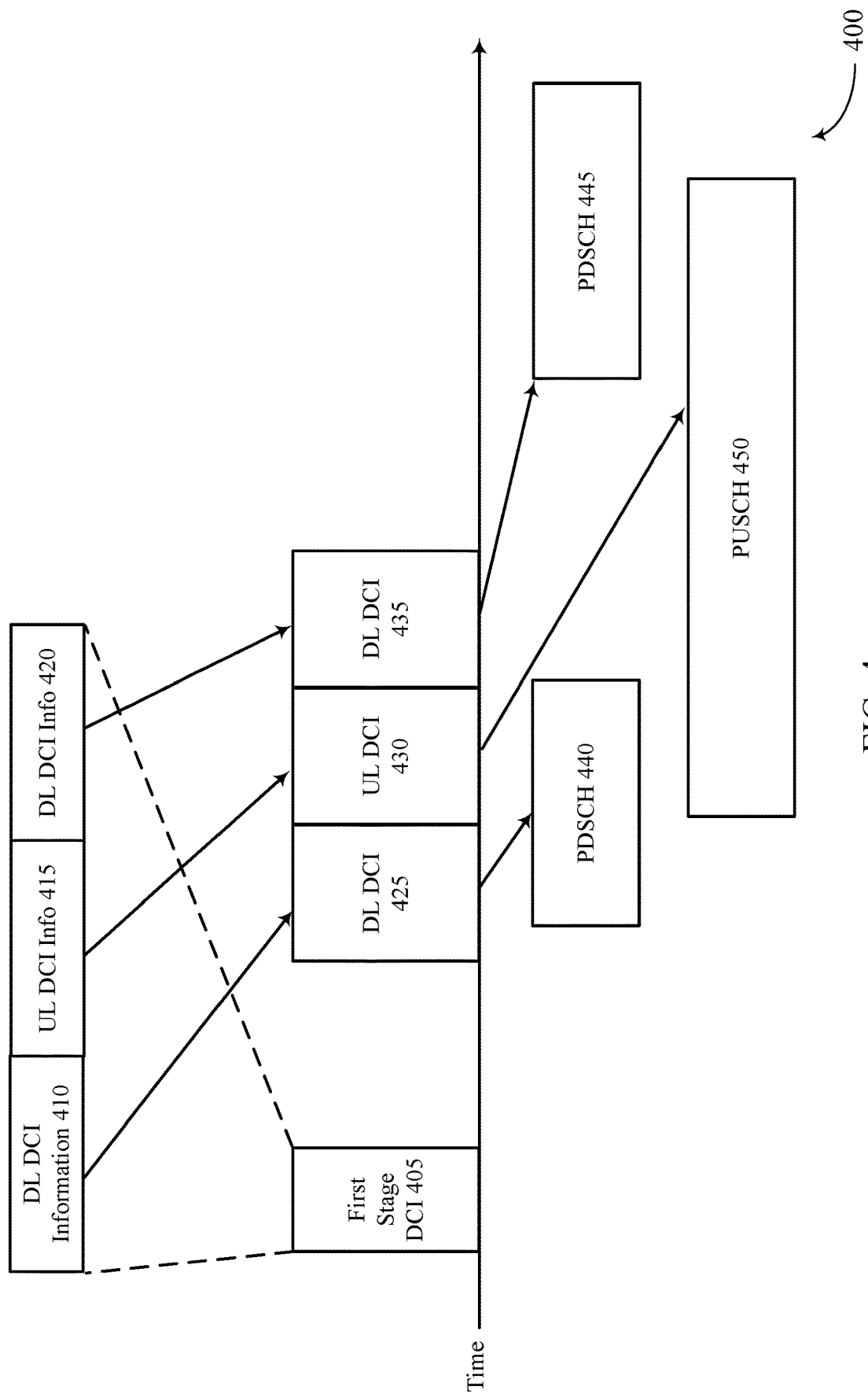
FIG. 4 illustrates an example of a timeline that supports control channel designs for dynamic full duplex enabling in accordance with aspects of the present disclosure.

FIG. 4 illustrates an example of a timeline 400 that supports control channel designs for dynamic full duplex enabling in accordance with aspects of the present disclosure. In some examples, timeline 400 may implement aspects of wireless communications system 100. For example, a base station 105 and a UE 115 may communicate according to timeline 300.

In some examples, base station 105 may schedule a full duplex operation using first-stage DCIs and second-stage DCIs. For example, base station 105 may transmit a first-stage DCI 405. In some examples, first-stage DCI 405 may include resource information related to the second-stage DCIs. For instance, first-stage DCI 405 may include resource information such as a time location (e.g., time resources), search space occasion indicators (e.g., indicators of which search space occasion to use for receiving second-stage DCIs), aggregation levels (ALs), PDCCH candidate indices of the second-stage DCIs, or any combination thereof. Such information may reduce the decoding complexity of second-stage DCIs.

First-stage DCI 405 may be smaller than a size threshold, which may result in reliable decoding of first-stage DCI 405. First-stage DCI 405 may include resource information or indications for multiple second-stage DCIs. Each second-stage DCI may schedule a single uplink transmission or a single downlink transmission. Thus, first-stage DCI 405 may include downlink DCI information 410 indicating resource information for second-stage downlink DCI 425, uplink DCI information 415 indicating resource information for second-stage uplink DCI 430, and downlink DCI information 420 indicating resource information for second-stage downlink DCI 435. UE 115 may receive and decode first-stage DCI 405 and may identify, based on the included DCI information, a location for receiving and decoding the second-stage DCIs.

Having identified the resource allocation information for the second-stage DCIs by decoding first-stage DCI 405, UE 115 may monitor for and receive the second-stage DCIs. Each second-stage DCI may include a single uplink grant or a single downlink grant. For instance, second-stage downlink DCI 425 may include a downlink grant allocating resources for a downlink transmission on PDSCH 440. Second-stage uplink DCI 430 may include an uplink grant allocating resource for an uplink transmission on PUSCH 450. Second-stage downlink DCI 435 may include a downlink grant allocating resources for a downlink transmission on PDSCH 445. At least a portion of the downlink transmission on PDSCH 440 and the downlink transmission on PDSCH 445 may overlap in time with the uplink transmission on PUSCH 450. UE 115 may identify and perform the full duplex operation during the overlapping portions.

By receiving the relatively small first-stage DCI 405, UE 115 may successfully identify resource allocation information for each second-stage DCI. UE 115 may then reliably decode the second-stage DCIs to receive the uplink and downlink grants. Thus, UE 115 may successfully identify a pending full duplex operation, and may configure the appropriate parameters for such full duplex operations.

In some examples, UE 115 may transmit feedback information to base station 105 indicating whether UE 115 has successfully received first-stage DCI 405. first-stage DCI 405 may include information for constructing feedback information (e.g., hybrid automatic request (HARQ) acknowledgment (ACK) messages or HARQ negative ACK (NACK) messages). For example, first-stage DCI 405 may include resource allocation information for transmitting feedback information, a transmission time interval (TTI) offset (e.g., a slot offset) indicating an offset between receiving first-stage DCI 405 and a timing for transmitting the feedback information, or the like. UE 115 may successfully decode first-stage DCI 405, and may transmit feedback information (e.g., a HARQ ACK message) on resources and/or at a timing indicated in first-stage DCI 405.

In some examples, a first-stage DCI 405 may include resource allocation information for uplink and downlink transmissions, as described in greater detail with reference to FIG. 5.

Figure 5:
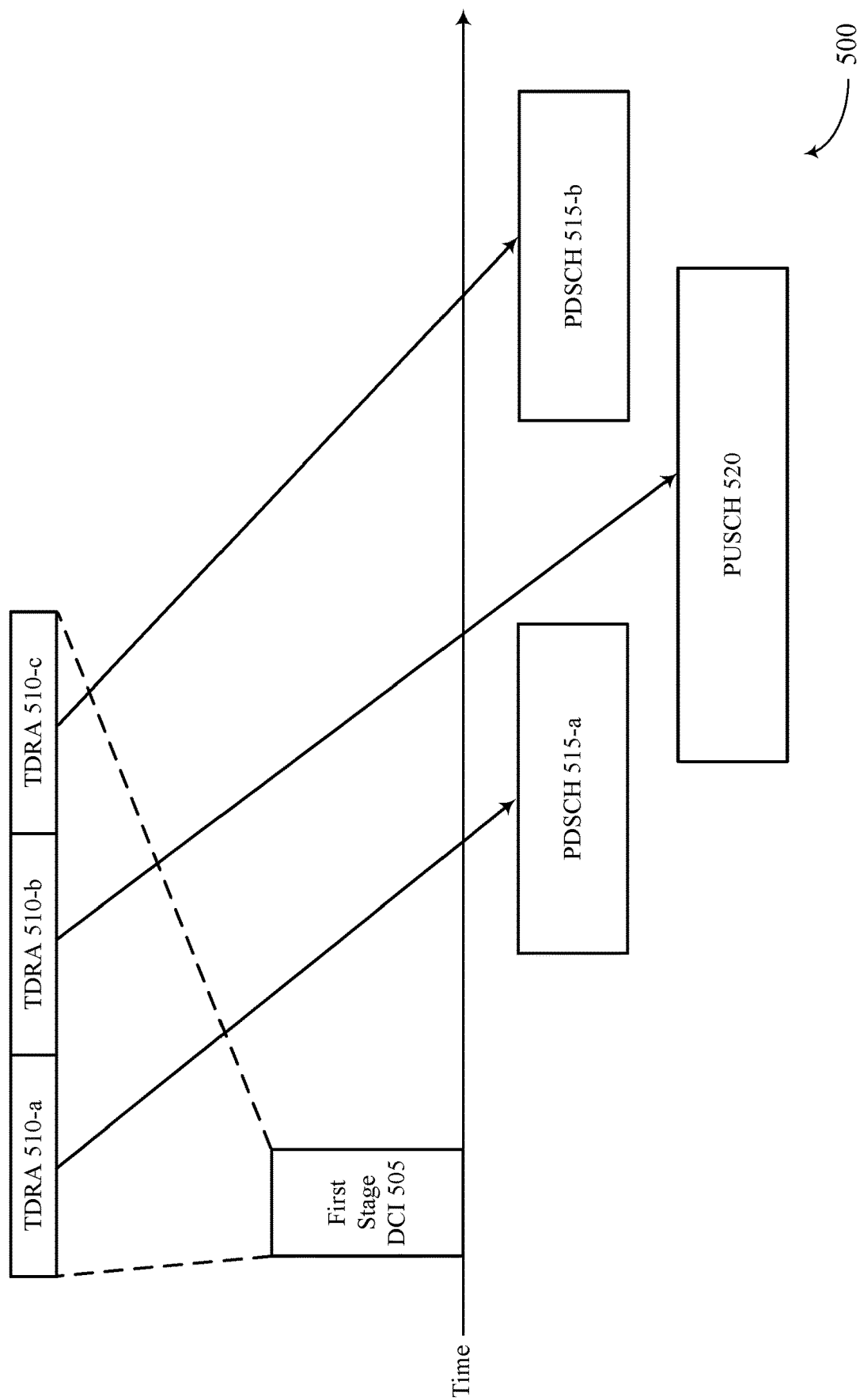
FIG. 5 illustrates an example of a timeline that supports control channel designs for dynamic full duplex enabling in accordance with aspects of the present disclosure.

FIG. 5 illustrates an example of a timeline 500 that supports control channel designs for dynamic full duplex enabling in accordance with aspects of the present disclosure. In some examples, timeline 500 may implement aspects of wireless communications system 100. For example, a base station 105 and a UE 115 may communicate according to timeline 500.

In some examples, base station 105 may transmit a first-stage DCI 505 and one or more second-stage DCIs. The first-stage DCI may include TDRA information for the uplink grants and the downlink grants included in the second-stage DCIs. For instance, first-stage DCI 505 may include TDRA information 510-a for a downlink transmission on PDSCH 515-a. First-stage DCI 505 may include TDRA information 510-b for an uplink transmission on PUSCH 520. First-stage DCI 505 may include TDRA information 510-c for a downlink transmission on PDSCH 515-b.

UE 115 may receive first-stage DCI 505, including the TDRA information. In some examples, first-stage DCI 505 may include resource information for one or more second-stage DCIs, the second-stage DCIs including uplink and downlink grants, as described in greater detail with reference to FIG. 5. Additionally, or alternatively, first-stage DCI 505 may include the TDRA information for the uplink and downlink transmissions. In such examples, UE 115 may perform one or more blind decoding procedures in one or more search spaces, PDCCH occasions, or the like, to identify and receive the second-stage DCIs.

UE 115 may utilize the TDRA information in first-stage DCI 505 to prepare to switch between half duplex operations and full duplex operations. For example, PDSCH 515-a and a portion of PUSCH 520 may overlap in time. Similarly, PDSCH 515-b and a portion of PUSCH 520 may overlap in term. However, for a time period between PDSCH 515-a and PDSCH 515-b, PUSCH 520 may not overlap with a PDSCH 515. Thus, UE 115 may perform a half duplex operation during that time period, but may perform a full duplex operation when PUSCH 520 overlaps with PDSCH 515-a and when PUSCH 520 overlaps with PDSCH 515-b. Alternatively, UE 115 may perform a full duplex operation during the entire PDSCH or PUSCH including that time period, and operation when PUSCH 520 overlaps with PDSCH 515-a and when PUSCH 520 overlaps with PDSCH 515-b. If UE 115 is not prepared to switch between the half duplex operation and the full duplex operations, then UE 115 may fail to successfully perform an uplink transmission or receive a downlink transmission. However, UE 115 may identify the timing at which it will switch between half duplex operations and full duplex operations based on the TDRA information included in first-stage DCI 505. Based on this identified timing, UE 115 may prepare to perform the switching, which may allow for more reliable transmission and reception during both full duplex operations and half duplex operations.

In some examples, UE 115 may transmit feedback information to base station 105 indicating whether UE 115 has successfully received first-stage DCI 505. first-stage DCI 505 may include information for constructing feedback information (e.g., hybrid automatic request (HARQ) acknowledgment (ACK) messages or HARQ negative ACK (NACK) messages). For example, first-stage DCI 505 may include resource allocation information for transmitting feedback information, a transmission time interval (TTI) offset (e.g., a slot offset) indicating an offset between receiving first-stage DCI 505 and a timing for transmitting the feedback information, or the like. UE 115 may successfully decode first-stage DCI 505, and may transmit feedback information (e.g., a HARQ ACK message) on resources and/or at a timing indicated in first-stage DCI 505.

Figure 6:
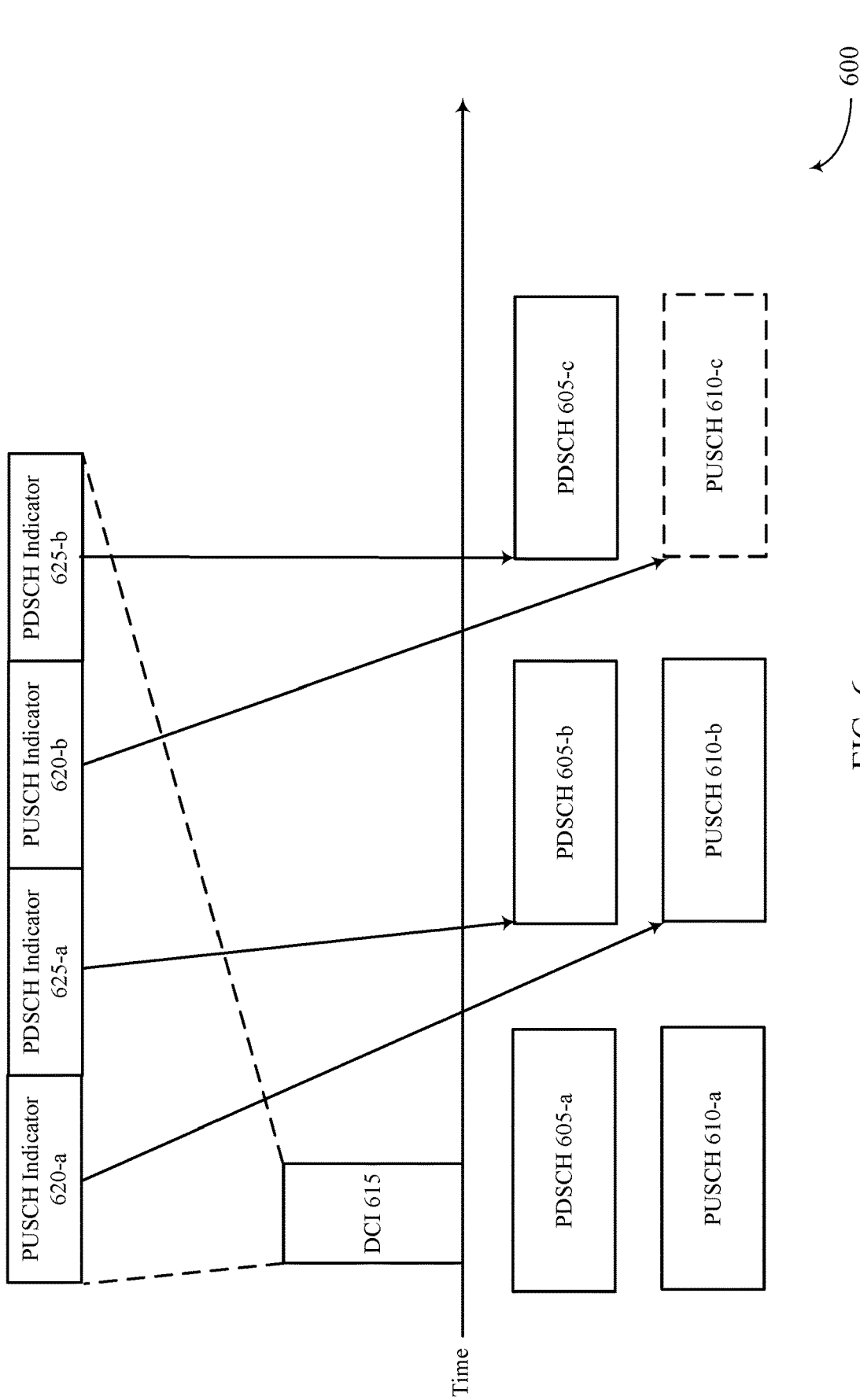
FIG. 6 illustrates an example of a timeline that supports control channel designs for dynamic full duplex enabling in accordance with aspects of the present disclosure.

FIG. 6 illustrates an example of a timeline 600 that supports control channel designs for dynamic full duplex enabling in accordance with aspects of the present disclosure. In some examples, timeline 600 may implement aspects of wireless communications system 100. For example, a base station 105 and a UE 115 may communicate according to timeline 600.

In some examples, base station 105 may schedule PDSCHs 605 and PUSCHs 610 via semi-persistent scheduling (SPS), and may dynamically trigger full duplex operations via DCI. Base station 105 may configure periodic or semi-periodic resources via higher layer signaling. For instance, base station 105 may configure PDSCH 605-a, PDSCH 605-b, and PDSCH 605-c for potential downlink transmissions. PDSCHs 605 may be periodic or semi-periodic. Base station 105 may also configure PUSCH 610-a, PUSCH 610-b, and PUSCH 610-c. PUSCHs 610 may be periodic or semi-periodic. In some examples, a portion or all of at least some PDSCHs 605 may overlap in time with a portion or all of at least some PUSCHs 610. Thus, the SPS scheduling may indicate potential transmission occasions in downlink or uplink. Whether a transmission is actually scheduled to occur may depend on whether there is data available for transfer.

In some examples, if a PDSCH 605 and a PUSCH 610 overlap in time, base station 105 may dynamically indicate whether a full duplex operation is scheduled on the overlapping transmission occasions. For instance, base station 105 may transmit DCI 615 to UE 115. DCI 615 may include one or more indicators of scheduled transmissions. PDSCH 605-a and PUSCH 610-a may not be indicated by DCI 615. For instance, a previously transmitted DCI message may schedule an uplink transmission on PUSCH 610-a, a downlink transmission on PDSCH 605-a, or both (e.g., but a single DCI may not dynamically indicate all downlink transmissions and all uplink transmissions in the periodic or semi-periodic transmission occasions). Thus, PDSCH 605-b and PUSCH 610-b, and subsequent PDSCHs 605 and PUSCHs 610 may be available for scheduling by DCI 615. UE 115 may have data for transmission after the occurrence of PUSCH 610-a during the occurrence of PUSCH 610-b, and base station 105 may identify data for downlink transmission after occurrence of PDSCH 605-a during PDSCH 605-b. In such examples, base station 105 may include one or more PUSCH indicators and one or more PDSCH indicators in DCI 615. For instance, DCI 615 may include PUSCH indicator 620-a, which may indicate that an uplink transmission is scheduled for PUSCH 610-b and PDSCH indicator 625-a, which may indicate that a downlink transmission is scheduled for PDSCH 605-b.

In some examples, DCI 615 may include individual indicators (e.g., one two-bit indicator for each pair of overlapping transmission occasion) for each PDSCH 605 and each PUSCH 610. Thus, a two-bit indicator may indicate whether a PDSCH 705 has a scheduled downlink transmission and whether a PUSCH 710 has a scheduled uplink transmission. For example, PUSCH indicator 620-a may be a one-bit indicator that can be turned on to indicate that an uplink transmission is scheduled for PUSCH 6310-b or turned off to indicate that an uplink transmission is not scheduled for PUSCH 6310-b. PUSCH indicator 620-a and PDSCH indicator 625-a may be included in DCI 615 as a single two-bit indicator in a single field, or as two separate indicators in separate fields. In some examples, DCI 615 may include a single, one-bit indicator for each pair of overlapping transmission occasions, as described in greater detail with reference to FIG. 7.

DCI 615 may only include indicators for a subsequent pair of overlapping transmission occasions (e.g., PDSCH 605-b and PUSCH 610-b) or for a set of one or more subsequent overlapping transmission occasions (e.g., PDSCH 605-b and PDSCH 605-c, and PUSCH 610-b and PUSCH 610-c, etc.). For instance, DCI 615—may include PUSCH indicator 620-a and PDSCH indicator 625-a, as described above. In some examples, DCI 615 may also include PUSCH indicator 620-b, which may indicate that no uplink transmission is scheduled for PUSCH 6110-c, and may also include PDSCH indicator 625-b, which may indicate that a downlink transmission is scheduled for PDSCH 605-c. In such examples, UE 115 may determine that a full duplex operation is scheduled during PDSCH 605-b and PUSCH 610-b, and that a half duplex operation is scheduled during PDSCH 605-c and PUSCH 610-c. In such examples, UE 115 may select appropriate parameter values (e.g., MCS, TCI states, beam selection, or the like) for the full duplex operation and appropriate parameter values for the half duplex operation.

In some examples, DCI 615 may also include updated scheduling information for subsequent transmission occasions. For instance, DCI 615 may provide indicators for PDSCH 605-b and PUSCH 610-b, and may include updated parameters (e.g., MCS, TCI states, power control parameters, or the like), for PDSCH 605-c and PUSCH 610-c.

In some examples, UE 115 may transmit feedback information to base station 105 indicating whether UE 115 has successfully received DCI 615. DCI 615 may include information for constructing feedback information (e.g., hybrid automatic request (HARQ) acknowledgment (ACK) messages or HARQ negative ACK (NACK) messages). For example, DCI 615 may include resource allocation information for transmitting feedback information, a transmission time interval (TTI) offset (e.g., a slot offset) indicating an offset between receiving DCI 615 and a timing for transmitting the feedback information, or the like. UE 115 may successfully decode DCI 615, and may transmit feedback information (e.g., a HARQ ACK message) on resources and/or at a timing indicated in DCI 615.

Figure 7:
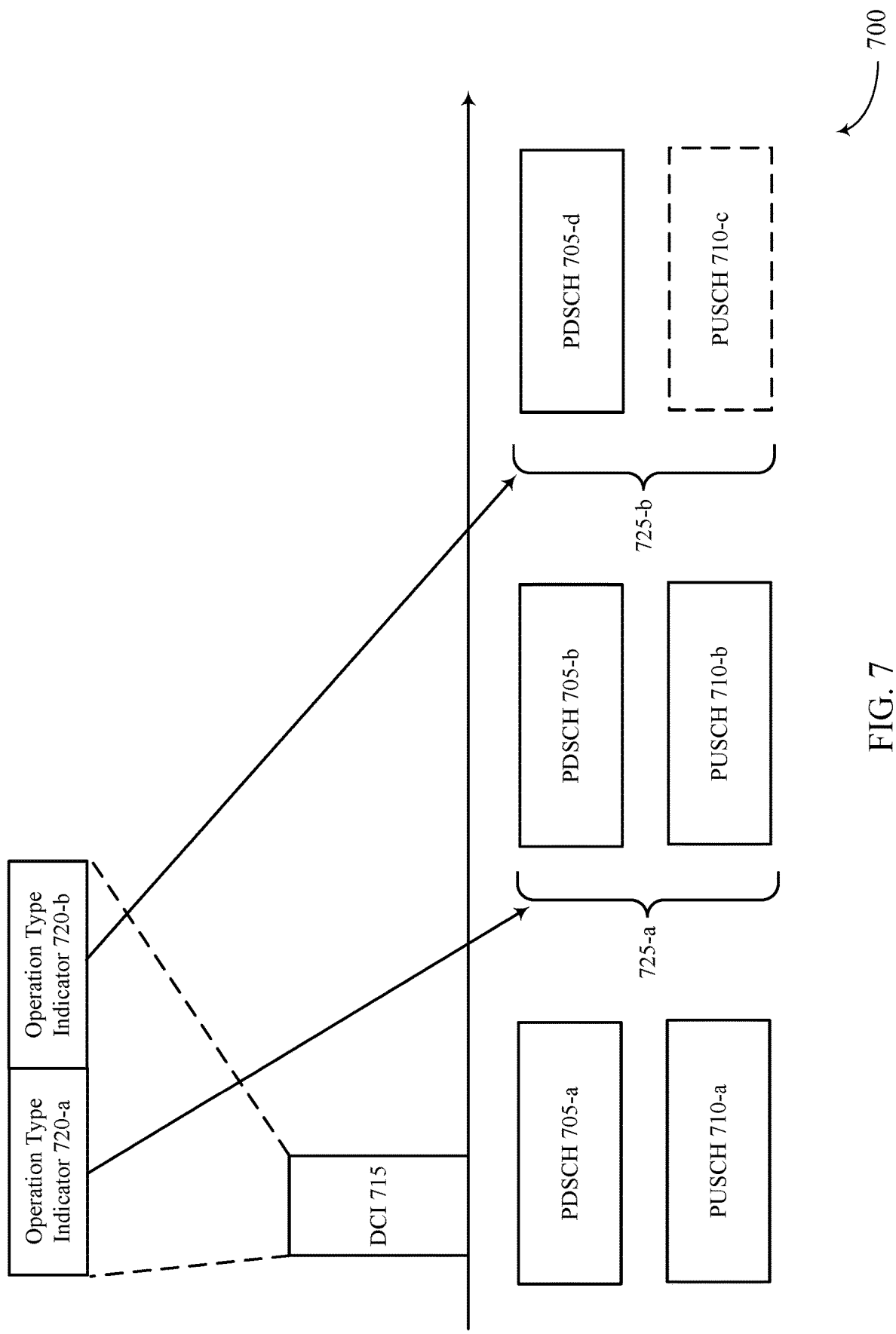
FIG. 7 illustrates an example of a timeline that supports control channel designs for dynamic full duplex enabling in accordance with aspects of the present disclosure.

FIG. 7 illustrates an example of a timeline 700 that supports control channel designs for dynamic full duplex enabling in accordance with aspects of the present disclosure. In some examples, timeline 700 may implement aspects of wireless communications system 100. For example, a base station 105 and a UE 115 may communicate according to timeline 700.

In some examples, base station 105 may schedule PDSCHs 705 and PUSCHs 710 via semi-persistent scheduling (SPS), and may dynamically trigger full duplex operations via DCI. Base station 105 may configure periodic or semi-periodic resources via higher layer signaling. For instance, base station 105 may configure PDSCH 705-a, PDSCH 705-b, and PDSCH 705-c for potential downlink transmissions. PDSCHs 705 may be periodic or semi-periodic. Base station 105 may also configure PUSCH 7-a, PUSCH 710-b, and PUSCH 710-c. PUSCHs 710 may be periodic or semi-periodic. In some examples, a portion or all of at least some PDSCHs 705 may overlap in time with a portion or all of at least some PUSCHs 710. Thus, the SPS scheduling may indicate potential transmission occasions in downlink or uplink. Whether a transmission is actually scheduled to occur may depend on whether there is data available for transfer.

In some examples, if a PDSCH 705 and a PUSCH 710 overlap in time, base station 105 may dynamically indicate whether a full duplex operation is scheduled on the overlapping transmission occasions. For instance, base station 105 may transmit DCI 715 to UE 115. DCI 715 may include one or more indicators of scheduled transmissions. PDSCH 705-a and PUSCH 710-a may not be indicated by DCI 715. For instance, a previously transmitted DCI message may schedule an uplink transmission on PUSCH 710-a, a downlink transmission on PDSCH 705-a, or both (e.g., but a single DCI may not dynamically indicate all downlink transmissions and all uplink transmissions in the periodic or semi-periodic transmission occasions). Thus, PDSCH 705-b and PUSCH 710-b, and subsequent PDSCHs 605 and PUSCHs 610 may be available for scheduling by DCI 615. UE 115 may have data for transmission after the occurrence of PUSCH 710-a during the occurrence of PUSCH 710-b, and base station 105 may identify data for downlink transmission after the occurrence of PDSCH 705-a during PDSCH 705-b. In such examples, base station 105 may include one or more operation type indicators 720 in DCI 715. For instance, DCI 715 may include operation type indicator 720-*a*, which may indicate that a full duplex operation is scheduled for overlapping transmission occasions 725-*a*. For example, operation type indicator 720-*a* may be a one-bit indicator that can be turned on to indicate scheduled overlapping uplink and downlink transmissions on PUSCH 710-*b* and PDSCH 705-*b*, respectively, or can be turned off to indicate that there is overlapping uplink and downlink transmissions have not been scheduled on PUSCH 710-*b* and PDSCH 705-*b*. UE 115 may receive DCI, and my determine, based on operation type indicator-*a*, that an uplink transmission is scheduled on PUSCH 710-*b* and a downlink transmission is scheduled on PDSCH 705-*b*. UE 115 may thus select appropriate parameters for performing the full duplex operation.

In some examples, DCI 715 may only include indicators for a subsequent pair of overlapping transmission occasions (e.g., PDSCH 705-*b* and PUSCH 710-*b*) or for a set of one or more subsequent overlapping transmission occasions (e.g., PDSCH 705-*b* and PDSCH 705-*c*, and PUSCH 710-*b* and PUSCH 710-*c*, etc.). For instance, DCI 715 may include operation type indicator 720-*a*, as described above. In some examples, DCI 715 may also include operation type indicator 720-*b*, which may indicate that no full duplex operation is scheduled during overlapping transmission occasions 725-*b*. For instance, base station 105 may schedule a downlink transmission during PDSCH 705-*d*, but UE 115 may not be scheduled for an uplink transmission on PUSCH 710-*c*. In such examples, operation type indicator 720-*b* may indicate that a half duplex operation is scheduled during overlapping transmission occasions 725-*b*. In such examples, UE 115 may select appropriate parameter values (e.g., MCS, TCI states, beam selection, or the like) for the full duplex operation and appropriate parameter values for the half duplex operation.

In some examples, UE 115 may transmit feedback information to base station 105 indicating whether UE 115 has successfully received DCI 715. DCI 715 may include information for constructing feedback information (e.g., hybrid automatic request (HARQ) acknowledgment (ACK) messages or HARQ negative ACK (NACK) messages). For example, DCI 715 may include resource allocation information for transmitting feedback information, a transmission time interval (TTI) offset (e.g., a slot offset) indicating an offset between receiving DCI 715 and a timing for transmitting the feedback information, or the like. UE 115 may successfully decode DCI 715, and may transmit feedback information (e.g., a HARQ ACK message) on resources and/or at a timing indicated in DCI 715.

Figure 8:
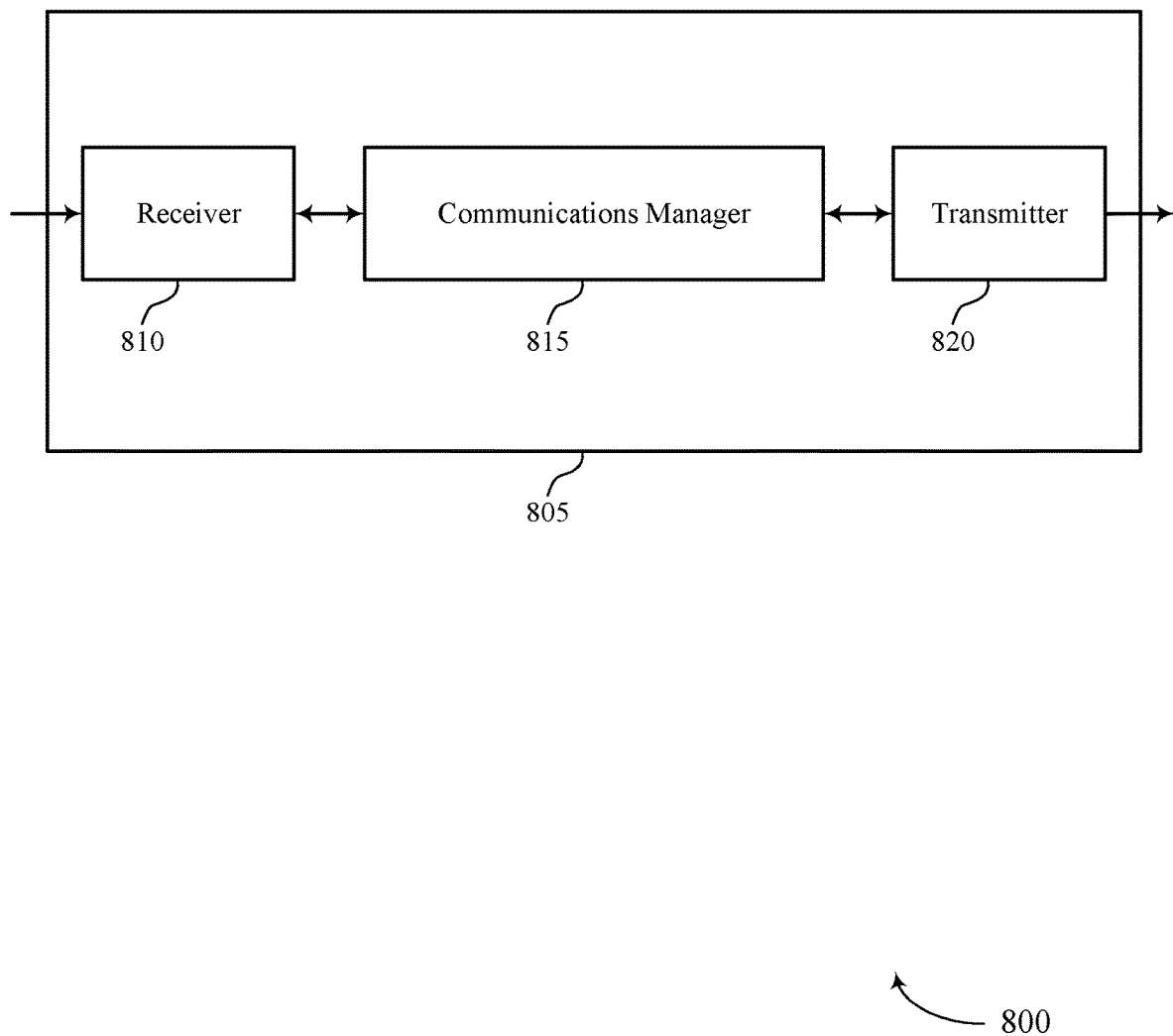
FIGS. 8 and 9 show block diagrams of devices that support control channel designs for dynamic full duplex enabling in accordance with aspects of the present disclosure.

FIG. 8 shows a block diagram 800 of a device 805 that supports control channel designs for dynamic full duplex enabling in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to control channel designs for dynamic full duplex enabling, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive DCI including an indication of a full duplex operation between the UE and a base station, where the DCI contains or references an uplink grant corresponding to an uplink transmission of the full duplex operation and a downlink grant corresponding to a downlink transmission of the full duplex operation, perform the uplink transmission of the full duplex operation based on the DCI and the uplink grant, and receive the downlink transmission of the full duplex operation based on the DCI and the downlink grant, where the uplink transmission and the downlink transmission at least partially overlap in time. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

In some examples, the communications manager 815 may be implemented as an integrated circuit or chipset for a mobile device modem, and the receiver 810 and transmitter 820 may be implemented as analog components (e.g., amplifiers, filters, antennas) coupled with the mobile device modem to enable wireless transmission and reception over one or more bands.

The communications manager 815 as described herein may be implemented to realize one or more potential advantages. One implementation may allow the device to more efficiently decode DCI, reserving processing resources and more efficiently expending power. This may result in decreased power expenditures and improved battery life. Additionally, implementations may allow the device to more accurately determine transmission and reception parameters, resulting in improved efficiency in transmitting and receiving, decreased system delays, and the like.

Figure 11:
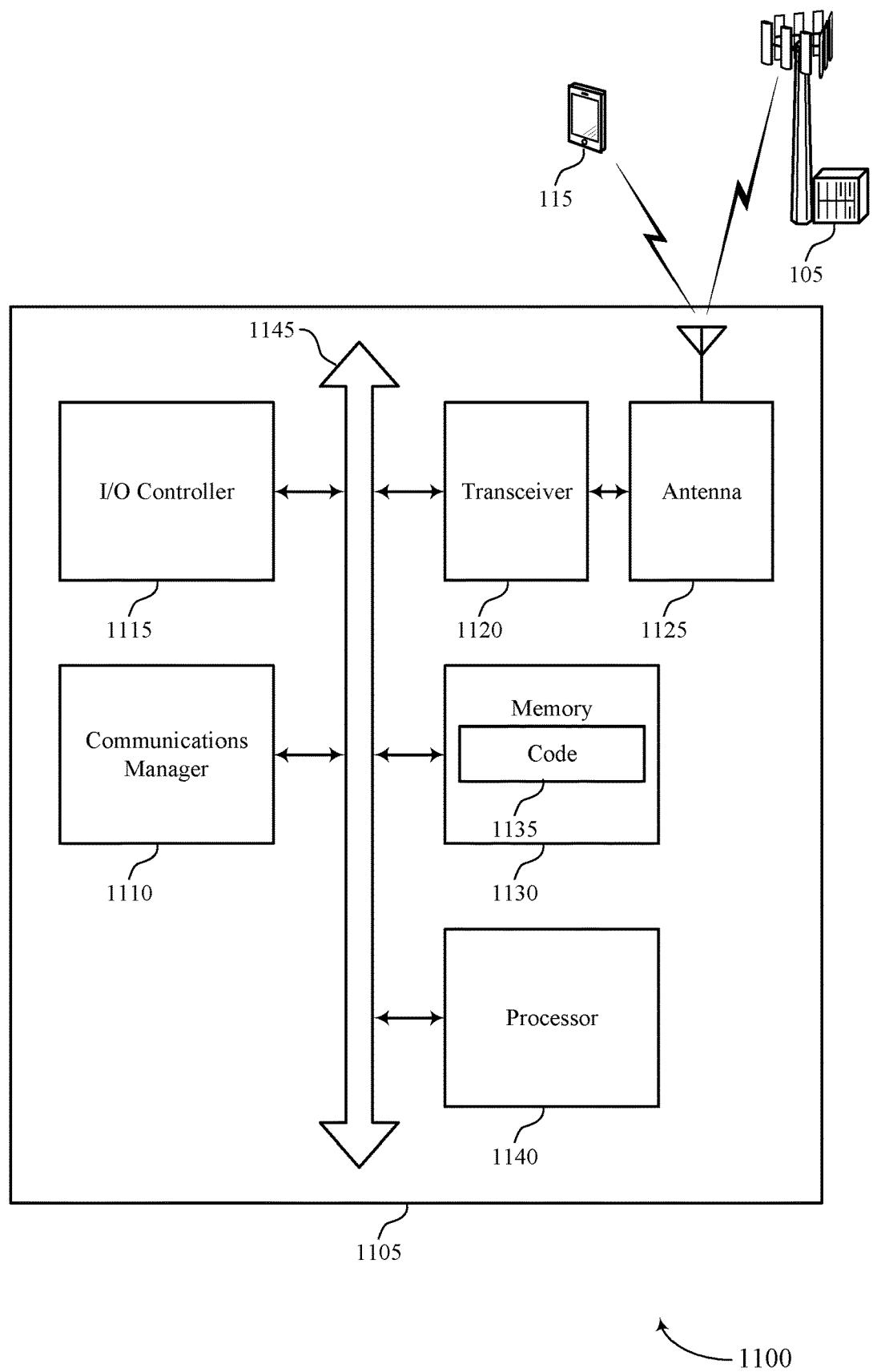
FIG. 11 shows a diagram of a system including a device that supports control channel designs for dynamic full duplex enabling in accordance with aspects of the present disclosure.

Based on techniques for efficiently identifying and performing full duplex operations for a device as described herein, a processor of a UE 115 (e.g., controlling the receiver 810, the transmitter 820, or a transceiver 1120 as described with respect to FIG. 11) may increase system efficiency and decrease unnecessary processing at a device.

Figure 9:
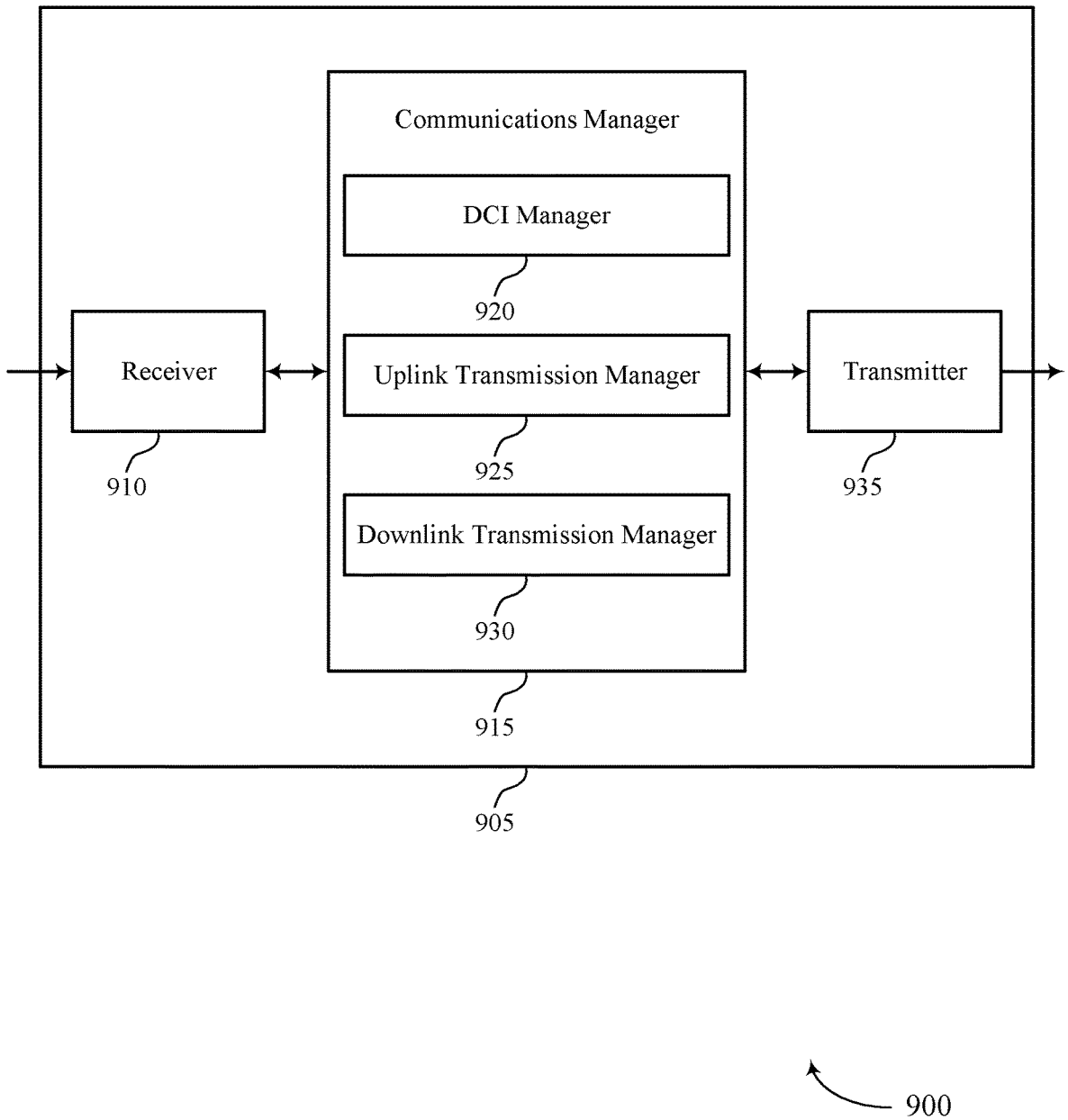

FIG. 9 shows a block diagram 900 of a device 905 that supports control channel designs for dynamic full duplex enabling in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to control channel designs for dynamic full duplex enabling, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a DCI manager 920, an uplink transmission manager 925, and a downlink transmission manager 930. The communications manager 915 may be an example of aspects of the communications manager 1110 described herein.

The DCI manager 920 may receive DCI including an indication of a full duplex operation between the UE and a base station, where the DCI contains or references an uplink grant corresponding to an uplink transmission of the full duplex operation and a downlink grant corresponding to a downlink transmission of the full duplex operation.

The uplink transmission manager 925 may perform the uplink transmission of the full duplex operation based on the DCI and the uplink grant.

The downlink transmission manager 930 may receive the downlink transmission of the full duplex operation based on the DCI and the downlink grant, where the uplink transmission and the downlink transmission at least partially overlap in time.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
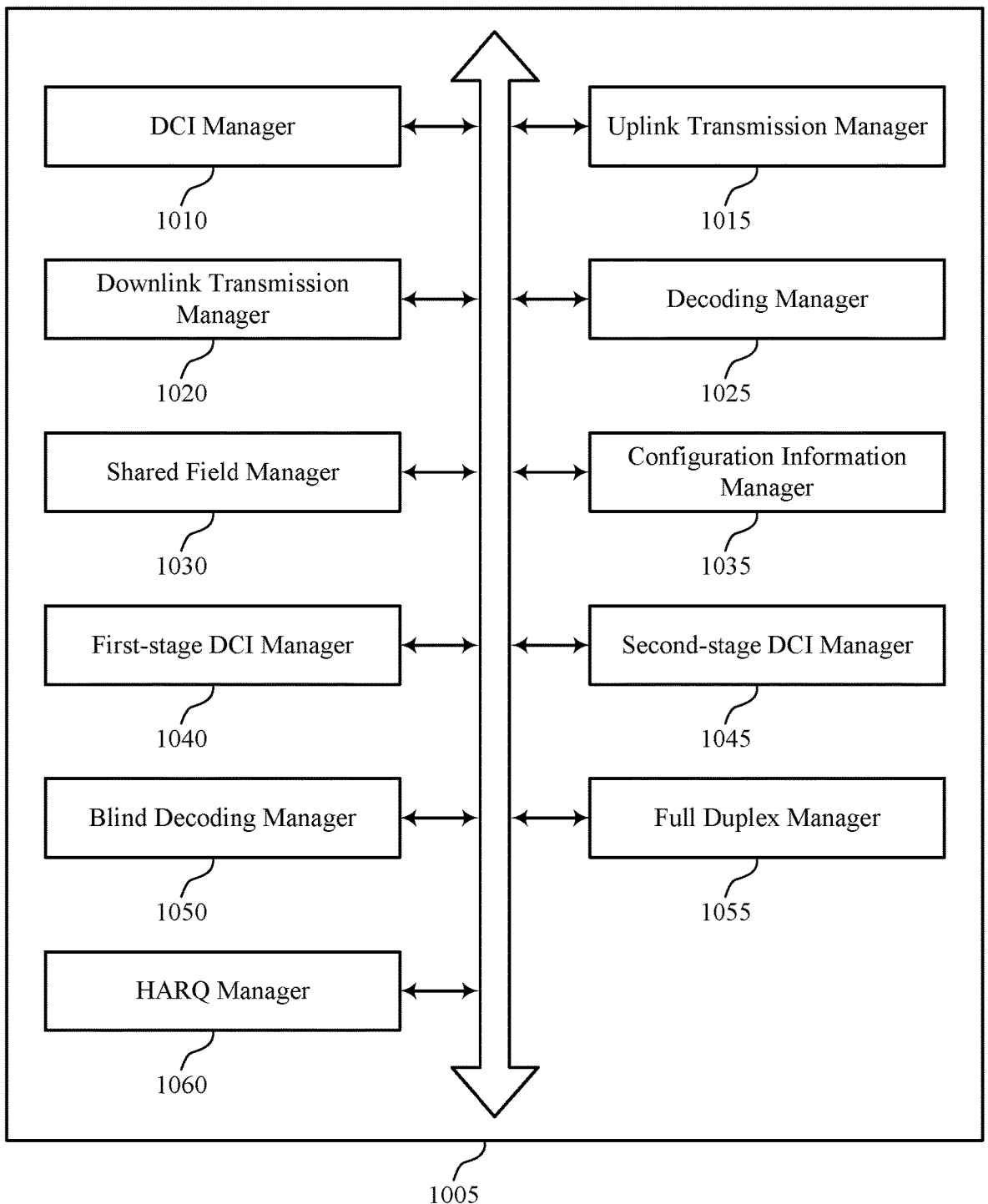
FIG. 10 shows a block diagram of a communications manager that supports control channel designs for dynamic full duplex enabling in accordance with aspects of the present disclosure.

FIG. 10 shows a block diagram 1000 of a communications manager 1005 that supports control channel designs for dynamic full duplex enabling in accordance with aspects of the present disclosure. The communications manager 1005 may be an example of aspects of a communications manager 815, a communications manager 915, or a communications manager 1110 described herein. The communications manager 1005 may include a DCI manager 1010, an uplink transmission manager 1015, a downlink transmission manager 1020, a decoding manager 1025, a shared field manager 1030, a configuration information manager 1035, a first-stage DCI manager 1040, a second-stage DCI manager 1045, a blind decoding manager 1050, a full duplex manager 1055, and a HARQ manager 1060. Each of these modules may communicate, directly or indirectly, with one another (e.g., via one or more buses).

The DCI manager 1010 may receive DCI including an indication of a full duplex operation between the UE and a base station, where the DCI contains or references an uplink grant corresponding to an uplink transmission of the full duplex operation and a downlink grant corresponding to a downlink transmission of the full duplex operation.

In some examples, the DCI manager 1010 may receive a first DCI message including the uplink grant and the downlink grant, the first DCI message including one or more dedicated uplink fields including information associated with the uplink grant, one or more dedicated downlink fields including information associated with the downlink grant, and one or more shared fields including information associated with both the uplink grant and the downlink grant.

In some examples, the DCI manager 1010 may receive a first DCI message including one or more parameters for the uplink transmission in one of the periodic or semi-periodic uplink transmission occasions subsequent to receiving the DCI, one or more parameters for the downlink transmission in one of the periodic or semi-periodic downlink transmission occasions subsequent to receiving the DCI, or both.

In some examples, the DCI manager 1010 may receive a first DCI message including an indication that the uplink transmission is scheduled in one of the uplink transmission occasions and the downlink transmission is scheduled in one of the downlink transmission occasions and the uplink transmission overlaps with the downlink transmission, or an indication that the full duplex operation is configured for the at least one of the uplink transmission occasions and the at least one of the downlink transmission occasions.

In some examples, the DCI manager 1010 may determine one or more parameters for the uplink transmission and the downlink transmission, based on the indication that the full duplex operation is configured. In some cases, the first DCI message is configured to schedule no more uplink transmissions than the uplink transmission and no more downlink transmissions than the downlink transmission. In some cases, the updated parameters include a power control, a modulation and coding scheme, a TCI state, or a combination thereof. In some cases, the one or more parameters include power control, a modulation and coding scheme, a TCI state, or a combination thereof.

The uplink transmission manager 1015 may perform the uplink transmission of the full duplex operation based on the DCI and the uplink grant.

The downlink transmission manager 1020 may receive the downlink transmission of the full duplex operation based on the DCI and the downlink grant, where the uplink transmission and the downlink transmission at least partially overlap in time.

The decoding manager 1025 may identify an RNTI associated with a first type of DCI message, where the first DCI message is the first type of DCI message. In some examples, the decoding manager 1025 may decode the first DCI message based on the identified RNTI. In some examples, the decoding manager 1025 may receive, from the base station, an indication of the RNTI, where identifying the RNTI is based on receiving the indication of the RNTI.

In some examples, the decoding manager 1025 may identify a cell RNTI associated with the first DCI message. In some examples, the decoding manager 1025 may determine that a size of the first DCI message is different from a size of a second DCI associated with the cell RNTI. In some examples, the decoding manager 1025 may decode the first DCI message based on the cell RNTI and the determining that the size of the first DCI message is different from the size of the second DCI.

The shared field manager 1030 may operate in a full duplex mode on an operating band where at least a first subband is allocated for uplink communications and at least a second subband is allocated for downlink communications, where a frequency domain resource assignment (FDRA) field is shared between the uplink grant and the downlink grant, and the uplink transmission and the downlink transmission are within resource blocks indicated by the FDRA field that overlap with the first subband, the second subband, respectively. In some examples, the shared field manager 1030 may identify, in the one or more shared fields, an indication of a single time domain resource assignment or an indication of a single bandwidth part index associated with both the uplink grant and the downlink grant. In some examples, the shared field manager 1030 may identify scheduling information for both the uplink grant and the downlink grant in the one or more shared fields of the first DCI message based on receiving the first DCI message and the configuration information tables.

The configuration information manager 1035 may receive, from the base station, configuration information tables for the one or more shared fields associated with the full duplex operation. In some examples, the configuration information manager 1035 may receive, from the base station, configuration information indicating periodic or semi-periodic uplink transmission occasions and periodic or semi-periodic downlink transmission occasions, where at least one of the uplink transmission occasions overlaps in time with at least one of the downlink transmission occasions. In some cases, the configuration information tables are provided in a radio resource control message, a MAC control element (CE), or a combination thereof.

The first-stage DCI manager 1040 may receive a first-stage DCI message. In some examples, the first-stage DCI manager 1040 may identify, based on receiving the first-stage DCI message, a set of one or more PDCCH candidates, one or more aggregation levels, one or more search space set occasions, or a combination thereof. In some examples, identifying, based on receiving the first-stage DCI message, time domain resource assignment information for the uplink transmission and the downlink transmission, where the time domain resource assignment information includes an indication of one or more symbols assigned to the uplink transmission and the downlink transmission, respectively. In some cases, the first-stage DCI message includes an indication of resources on which to receive the first second-stage DCI message and the second second-stage DCI message.

The second-stage DCI manager 1045 may receive, based on receiving the first-stage DCI message, a first second-stage DCI message and a second second-stage DCI message. In some examples, the first second-stage DCI message includes the uplink grant and where the second second-stage DCI message includes the downlink grant.

The blind decoding manager 1050 may perform one or more blind decoding procedures on the set of one or more PDCCH candidates based on the set of one or more PDCCH candidates, the one or more aggregation levels, the one or more search space set occasions, or any combination thereof, where receiving the first second-stage DCI message and the second second-stage DCI message is based on performing the one or more blind decoding procedures.

The full duplex manager 1055 may configure one or more transmit antennas, one or more transmit beams, one or more receive antennas, one or more receive beams, or a combination thereof, for switching operations between a half duplex operation and the full duplex operation according to the time domain resource assignment information.

The HARQ manager 1060 may identify, based on receiving the first-stage DCI message, time resources, frequency resources, or both for transmitting an acknowledgment message associated with the first-stage DCI message. In some examples, the HARQ manager 1060 may transmit the acknowledgement message on the identified time resources, frequency resources, or both. In some examples, the HARQ manager 1060 may identify, based on receiving the first DCI message, time resources, frequency resources, or both for transmitting an acknowledgment message associated with the first DCI message.

FIG. 11 shows a diagram of a system 1100 including a device 1105 that supports control channel designs for dynamic full duplex enabling in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive DCI including an indication of a full duplex operation between the UE and a base station, where the DCI contains or references an uplink grant corresponding to an uplink transmission of the full duplex operation and a downlink grant corresponding to a downlink transmission of the full duplex operation, perform the uplink transmission of the full duplex operation based on the DCI and the uplink grant, and receive the downlink transmission of the full duplex operation based on the DCI and the downlink grant, where the uplink transmission and the downlink transmission at least partially overlap in time.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting control channel designs for dynamic full duplex enabling).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
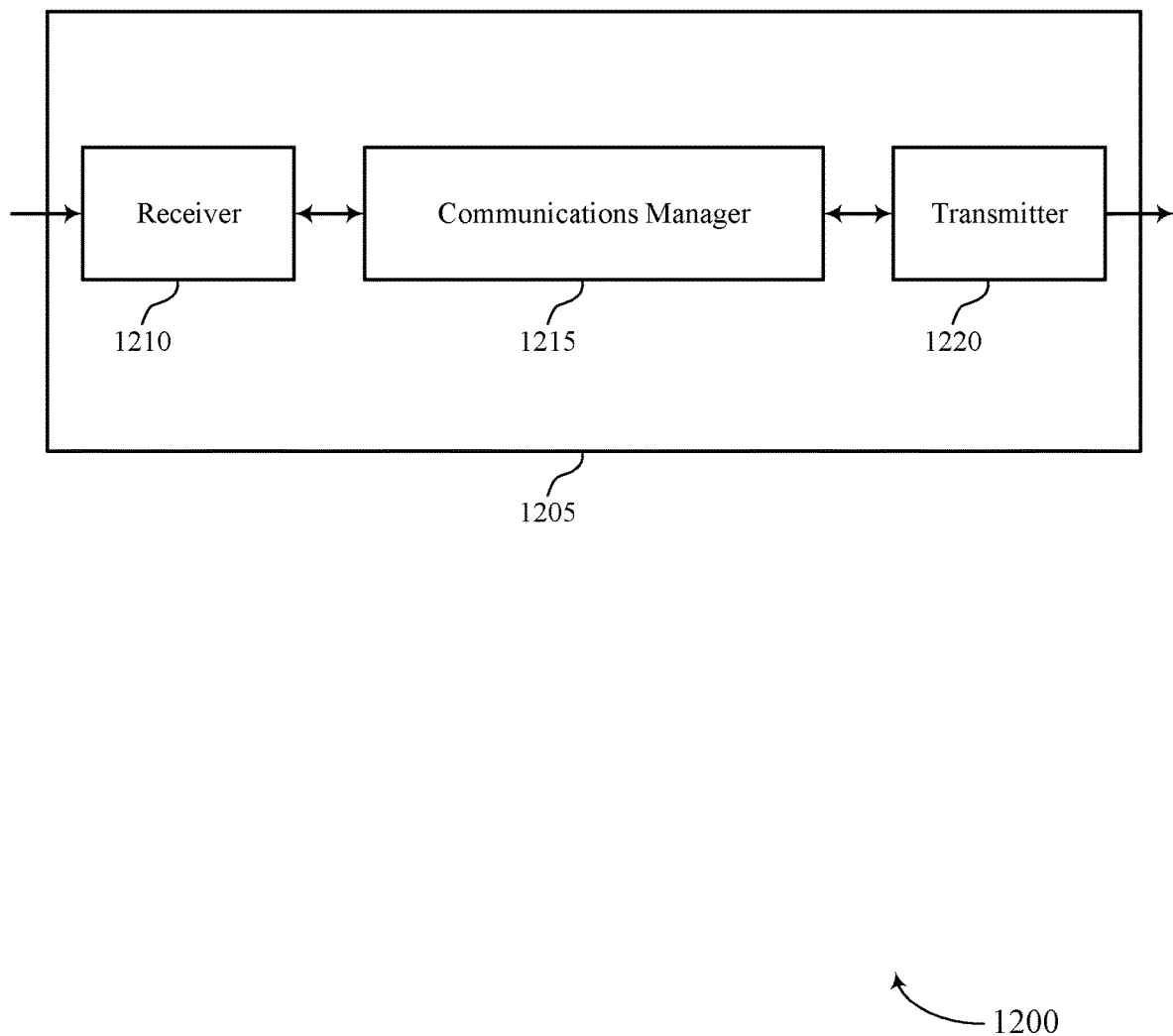
FIGS. 12 and 13 show block diagrams of devices that support control channel designs for dynamic full duplex enabling in accordance with aspects of the present disclosure.

FIG. 12 shows a block diagram 1200 of a device 1205 that supports control channel designs for dynamic full duplex enabling in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to control channel designs for dynamic full duplex enabling, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit, to a UE DCI including an indication of a full duplex operation between the UE and the base station, where the DCI contains or references an uplink grant corresponding to an uplink transmission of the full duplex operation and a downlink grant corresponding to a downlink transmission of the full duplex operation, receive the uplink transmission of the full duplex operation based on the DCI and the uplink grant, and perform the downlink transmission of the full duplex operation based on the DCI and the downlink grant, where the uplink transmission and the downlink transmission at least partially overlap in time. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
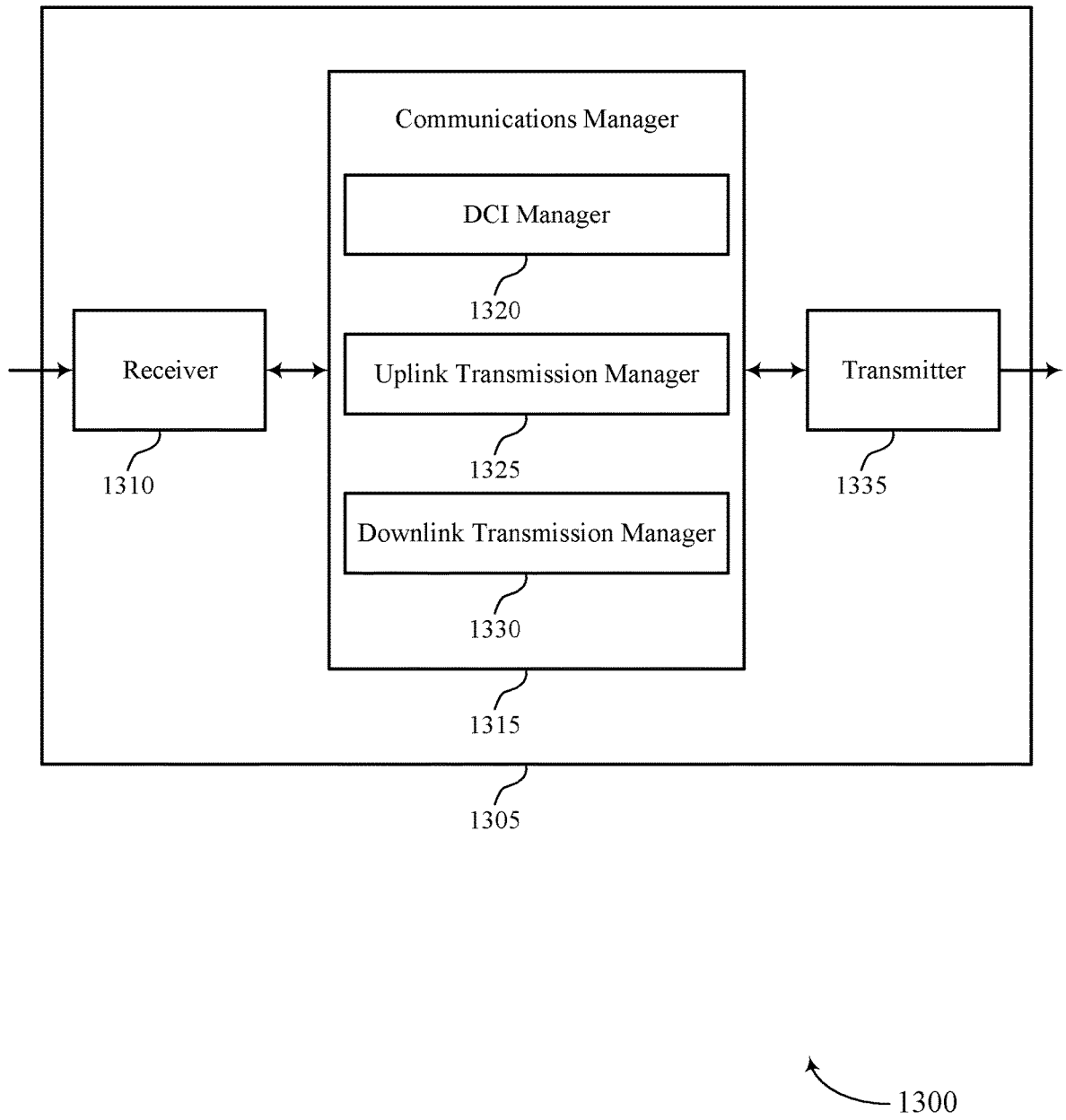

FIG. 13 shows a block diagram 1300 of a device 1305 that supports control channel designs for dynamic full duplex enabling in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to control channel designs for dynamic full duplex enabling, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a DCI manager 1320, an uplink transmission manager 1325, and a downlink transmission manager 1330. The communications manager 1315 may be an example of aspects of the communications manager 1510 described herein.

The DCI manager 1320 may transmit, to a UE DCI including an indication of a full duplex operation between the UE and the base station, where the DCI contains or references an uplink grant corresponding to an uplink transmission of the full duplex operation and a downlink grant corresponding to a downlink transmission of the full duplex operation.

The uplink transmission manager 1325 may receive the uplink transmission of the full duplex operation based on the DCI and the uplink grant.

The downlink transmission manager 1330 may perform the downlink transmission of the full duplex operation based on the DCI and the downlink grant, where the uplink transmission and the downlink transmission at least partially overlap in time.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
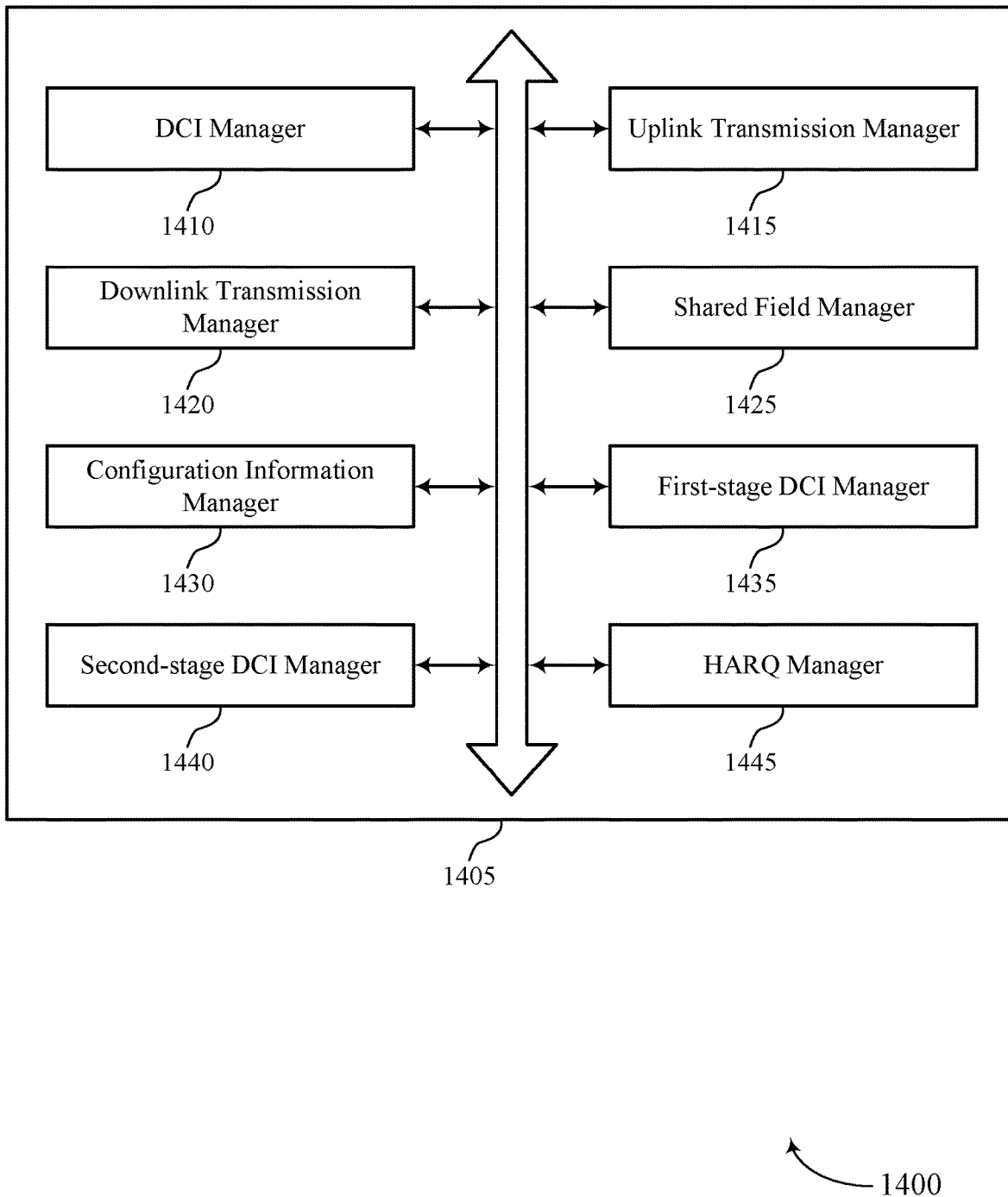
FIG. 14 shows a block diagram of a communications manager that supports control channel designs for dynamic full duplex enabling in accordance with aspects of the present disclosure.

FIG. 14 shows a block diagram 1400 of a communications manager 1405 that supports control channel designs for dynamic full duplex enabling in accordance with aspects of the present disclosure. The communications manager 1405 may be an example of aspects of a communications manager 1215, a communications manager 1315, or a communications manager 1510 described herein. The communications manager 1405 may include a DCI manager 1410, an uplink transmission manager 1415, a downlink transmission manager 1420, a shared field manager 1425, a configuration information manager 1430, a first-stage DCI manager 1435, a second-stage DCI manager 1440, and a HARQ manager 1445. Each of these modules may communicate, directly or indirectly, with one another (e.g., via one or more buses).

The DCI manager 1410 may transmit, to a UE DCI including an indication of a full duplex operation between the UE and the base station, where the DCI contains or references an uplink grant corresponding to an uplink transmission of the full duplex operation and a downlink grant corresponding to a downlink transmission of the full duplex operation. In some examples, the DCI manager 1410 may transmit a first DCI message including the uplink grant and the downlink grant, the first DCI message including one or more dedicated uplink fields including information associated with the uplink grant, one or more dedicated downlink fields including information associated with the downlink grant, and one or more shared fields including information associated with both the uplink grant and the downlink grant.

In some examples, the DCI manager 1410 may transmit, to the UE, an indication of a RNTI associated with a first type of DCI message, where the first DCI message is the first type of DCI message. In some examples, the DCI manager 1410 may both the uplink grant and the downlink grant indicate resources that at least partially overlap with a first subband of an operating band, a second subband of an operating band, or both, where the first subband is allocated for uplink communications, and the second subband is allocated for downlink communications. In some examples, the DCI manager 1410 may transmit a first DCI message including one or more parameters for the uplink transmission in one of the periodic or semi-periodic uplink transmission occasions subsequent to receiving the DCI, one or more parameters for the downlink transmission in one of the periodic or semi-periodic downlink transmission occasions subsequent to receiving the DCI, or both.

In some examples, the DCI manager 1410 may transmit a first DCI message including an indication that the uplink transmission is scheduled in one of the uplink transmission occasions and the downlink transmission is scheduled in one of the downlink transmission occasions and the uplink transmission overlaps with the downlink transmission, or an indication that the full duplex operation is configured for the at least one of the uplink transmission occasions and the at least one of the downlink transmission occasions. In some cases, the first DCI message is configured to schedule no more uplink transmissions than the uplink transmission and no more downlink transmissions than the downlink transmission. In some cases, the updated parameters include a power control, a modulation and coding scheme, a TCI state, or a combination thereof. In some cases, one or more parameters for the uplink transmission and the downlink transmission are associated with the full duplex operation, the one or more parameters including power control, a modulation and coding scheme, a TCI state, or a combination thereof.

The uplink transmission manager 1415 may receive the uplink transmission of the full duplex operation based on the DCI and the uplink grant.

The downlink transmission manager 1420 may perform the downlink transmission of the full duplex operation based on the DCI and the downlink grant, where the uplink transmission and the downlink transmission at least partially overlap in time.

The shared field manager 1425 may include, in the one or more shared fields, an indication of a single time domain resource assignment or an indication of a single bandwidth part index associated with both the uplink grant and the downlink grant.

The configuration information manager 1430 may transmit, to the UE, configuration information tables for the one or more shared fields associated with the full duplex operation. In some examples, the configuration information manager 1430 may transmit, to the UE, configuration information indicating periodic or semi-periodic uplink transmission occasions and periodic or semi-periodic downlink transmission occasions, where at least one of the uplink transmission occasions overlaps in time with at least one of the downlink transmission occasions. In some cases, the configuration information tables are provided in a radio resource control message, a MAC-CE, or a combination thereof.

The first-stage DCI manager 1435 may transmit a first-stage DCI message. In some examples, the first-stage DCI manager 1435 may include, in the first-stage DCI message, an indication of a set of one or more PDCCH candidates, one or more aggregation levels, one or more search space set occasions, or a combination thereof. In some examples, the first-stage DCI message includes time domain resource assignment information for the uplink transmission and the downlink transmission, where the time domain resource assignment information includes an indication of one or more symbols assigned to the uplink transmission and the downlink transmission, respectively, and where receiving the uplink transmission and performing the downlink transmission is based on the time domain resource assignment information. In some cases, the first-stage DCI message includes an indication of resources on which to receive the first second-stage DCI message and the second second-stage DCI message.

The second-stage DCI manager 1440 may transmit, based on transmitting the first-stage DCI message, a first second-stage DCI message and a second second-stage DCI message. In some examples, the first second-stage DCI message includes the uplink grant and where the second second-stage DCI message includes the downlink grant.

The HARQ manager 1445 may include, in the first-stage DCI message, an indication of time resources, frequency resources, or both for transmitting an acknowledgment message associated with the first-stage DCI message. In some examples, the HARQ manager 1445 may receive the acknowledgement message over the indicated time resources, frequency resources, or both. In some examples, the HARQ manager 1445 may include, in a first DCI message, an indication of time resources, frequency resources, or both, for transmitting an acknowledgment message associated with the first DCI message. In some examples, the HARQ manager 1445 may receive the acknowledgement message over the indicated time resources, frequency resources, or both.

Figure 15:
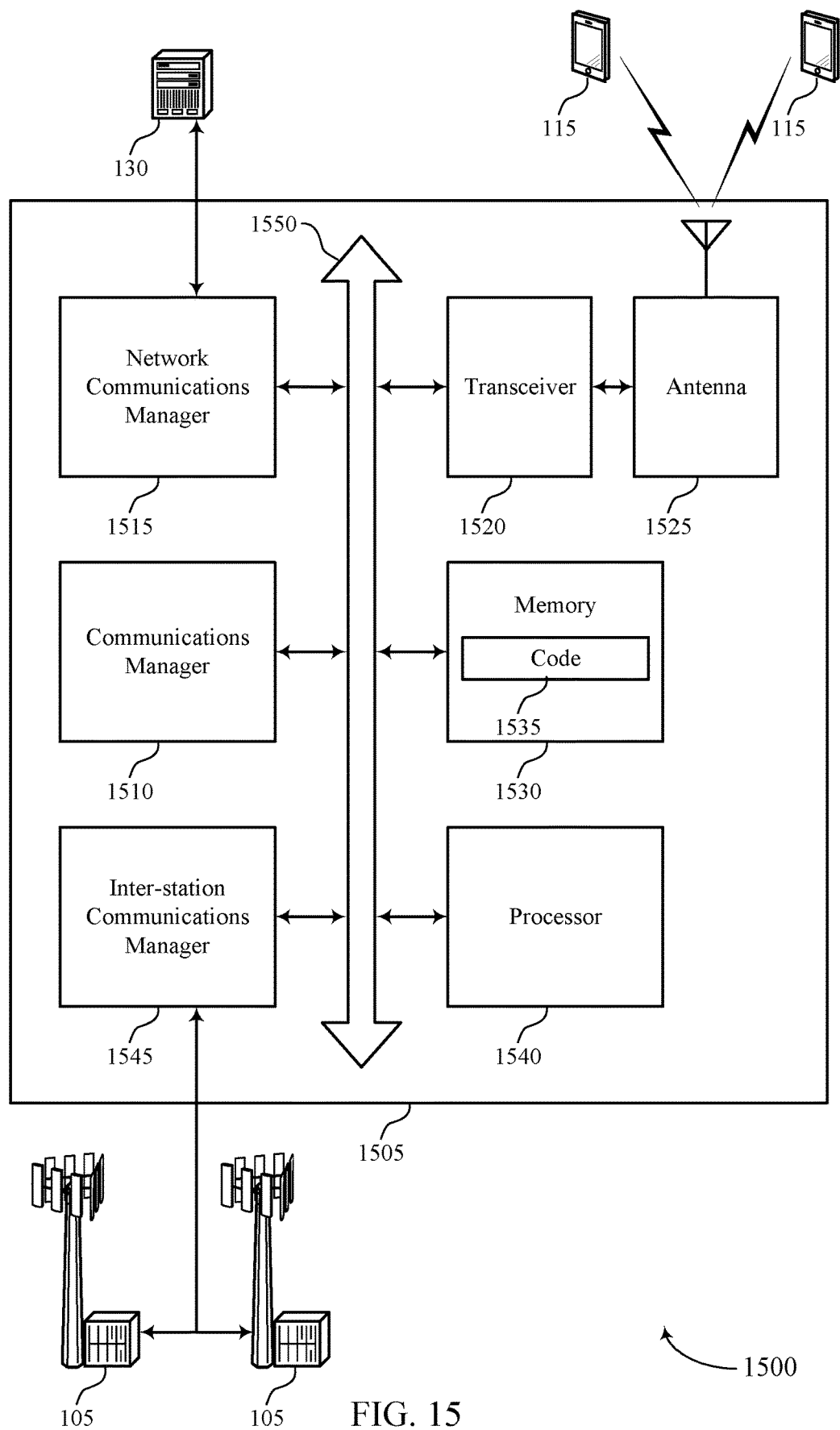
FIG. 15 shows a diagram of a system including a device that supports control channel designs for dynamic full duplex enabling in accordance with aspects of the present disclosure.

FIG. 15 shows a diagram of a system 1500 including a device 1505 that supports control channel designs for dynamic full duplex enabling in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit, to a UE DCI including an indication of a full duplex operation between the UE and the base station, where the DCI contains or references an uplink grant corresponding to an uplink transmission of the full duplex operation and a downlink grant corresponding to a downlink transmission of the full duplex operation, receive the uplink transmission of the full duplex operation based on the DCI and the uplink grant, and perform the downlink transmission of the full duplex operation based on the DCI and the downlink grant, where the uplink transmission and the downlink transmission at least partially overlap in time.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting control channel designs for dynamic full duplex enabling).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
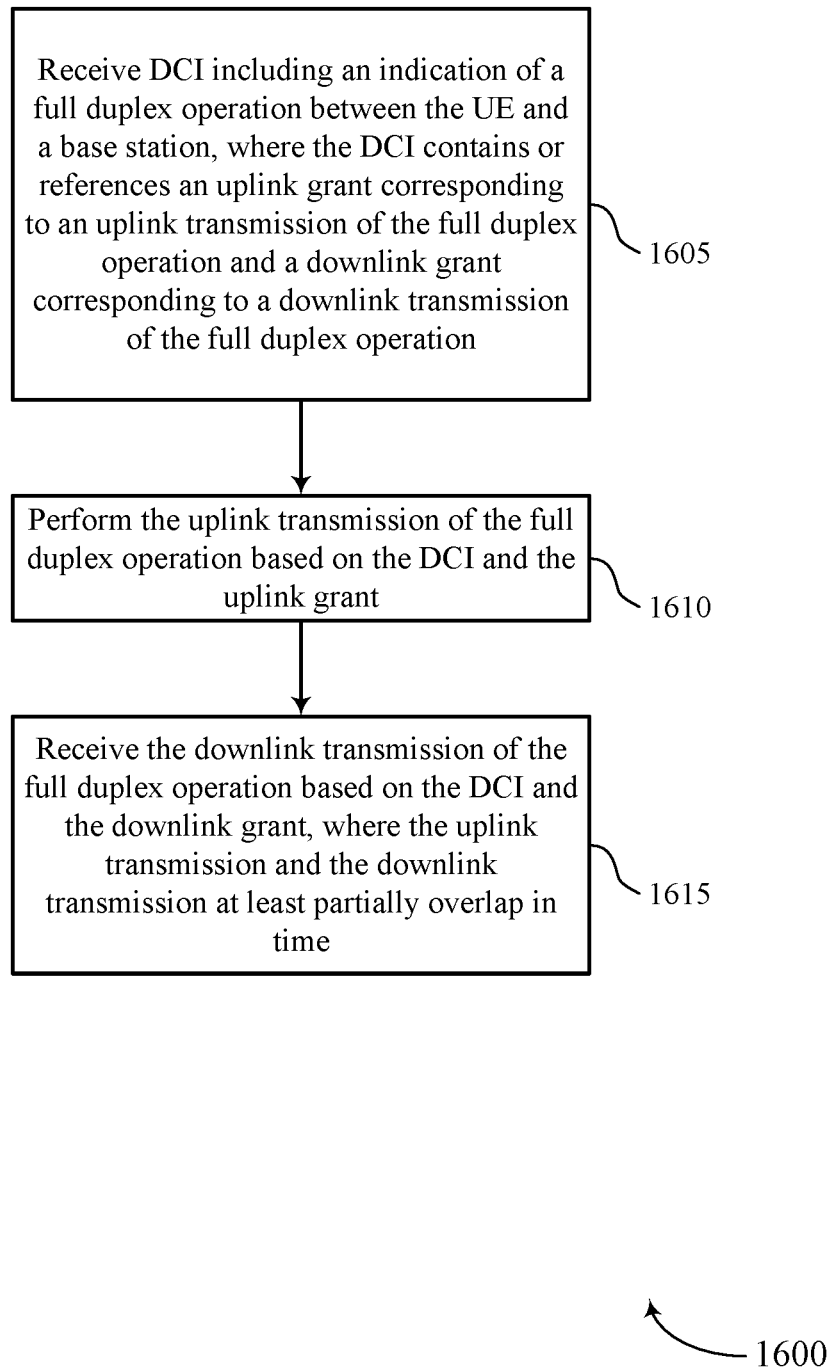
FIGS. 16 through 20 show flowcharts illustrating methods that support control channel designs for dynamic full duplex enabling in accordance with aspects of the present disclosure.

FIG. 16 shows a flowchart illustrating a method 1600 that supports control channel designs for dynamic full duplex enabling in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of one or more instructions to control the functional elements of the UE to perform the functions described below. Additionally, or alternatively, a UE may perform aspects of the functions described below using special-purpose hardware.

At 1605, the UE may receive DCI including an indication of a full duplex operation between the UE and a base station, where the DCI contains or references an uplink grant corresponding to an uplink transmission of the full duplex operation and a downlink grant corresponding to a downlink transmission of the full duplex operation. The operations of 1605 may be performed according to the methods described herein. In some examples, aspects of the operations of 1605 may be performed by a DCI manager as described with reference to FIGS. 8 through 11.

At 1610, the UE may perform the uplink transmission of the full duplex operation based on the DCI and the uplink grant. The operations of 1610 may be performed according to the methods described herein. In some examples, aspects of the operations of 1610 may be performed by an uplink transmission manager as described with reference to FIGS. 8 through 11.

At 1615, the UE may receive the downlink transmission of the full duplex operation based on the DCI and the downlink grant, where the uplink transmission and the downlink transmission at least partially overlap in time. The operations of 1615 may be performed according to the methods described herein. In some examples, aspects of the operations of 1615 may be performed by a downlink transmission manager as described with reference to FIGS. 8 through 11.

Figure 17:
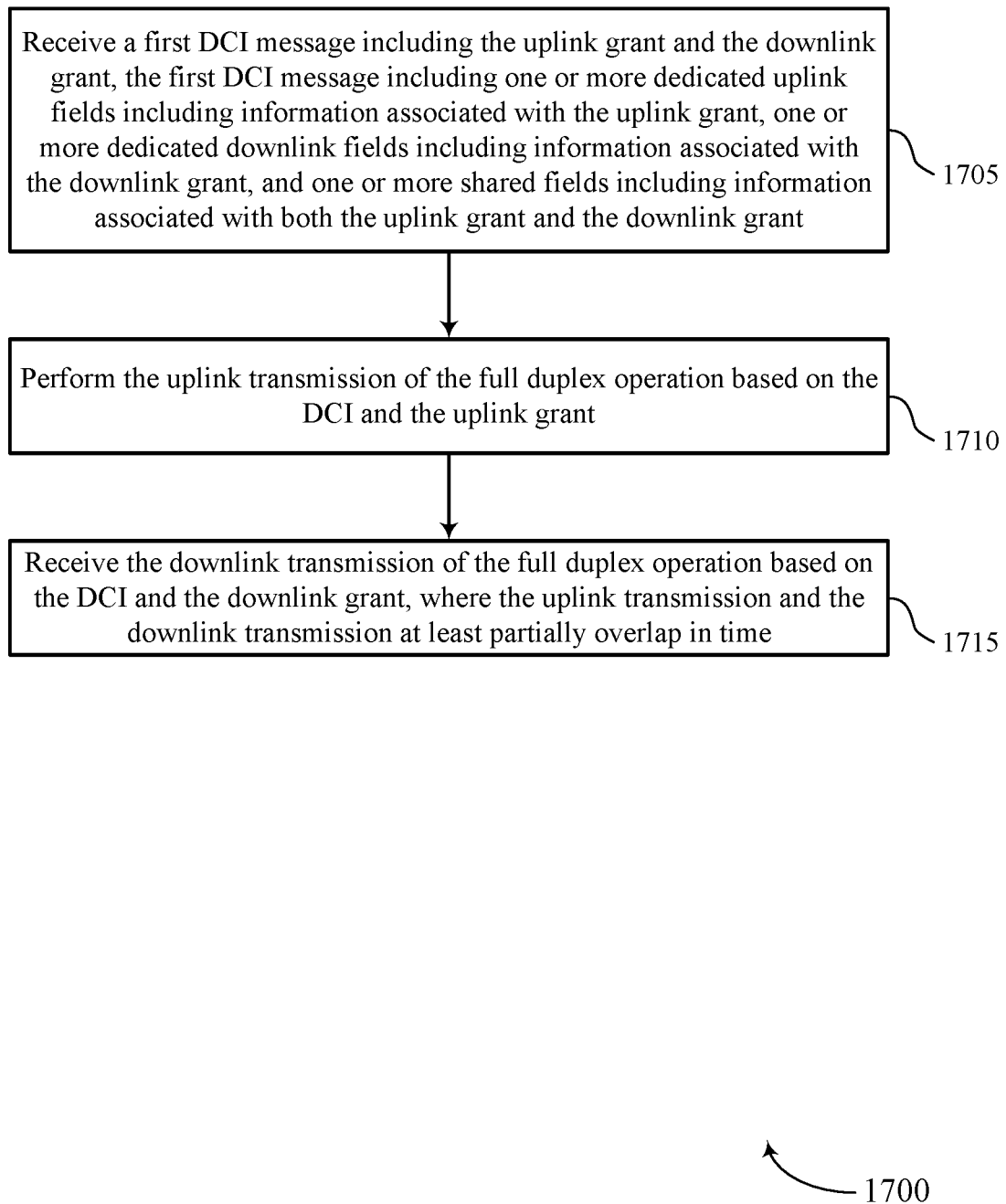

FIG. 17 shows a flowchart illustrating a method 1700 that supports control channel designs for dynamic full duplex enabling in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1705, the UE may receive a first DCI message including the uplink grant and the downlink grant, the first DCI message including one or more dedicated uplink fields including information associated with the uplink grant, one or more dedicated downlink fields including information associated with the downlink grant, and one or more shared fields including information associated with both the uplink grant and the downlink grant. The operations of 1705 may be performed according to the methods described herein. In some examples, aspects of the operations of 1705 may be performed by a DCI manager as described with reference to FIGS. 8 through 11.

At 1710, the UE may perform the uplink transmission of the full duplex operation based on the DCI and the uplink grant. The operations of 1710 may be performed according to the methods described herein. In some examples, aspects of the operations of 1710 may be performed by an uplink transmission manager as described with reference to FIGS. 8 through 11.

At 1715, the UE may receive the downlink transmission of the full duplex operation based on the DCI and the downlink grant, where the uplink transmission and the downlink transmission at least partially overlap in time. The operations of 1715 may be performed according to the methods described herein. In some examples, aspects of the operations of 1715 may be performed by a downlink transmission manager as described with reference to FIGS. 8 through 11.

Figure 18:
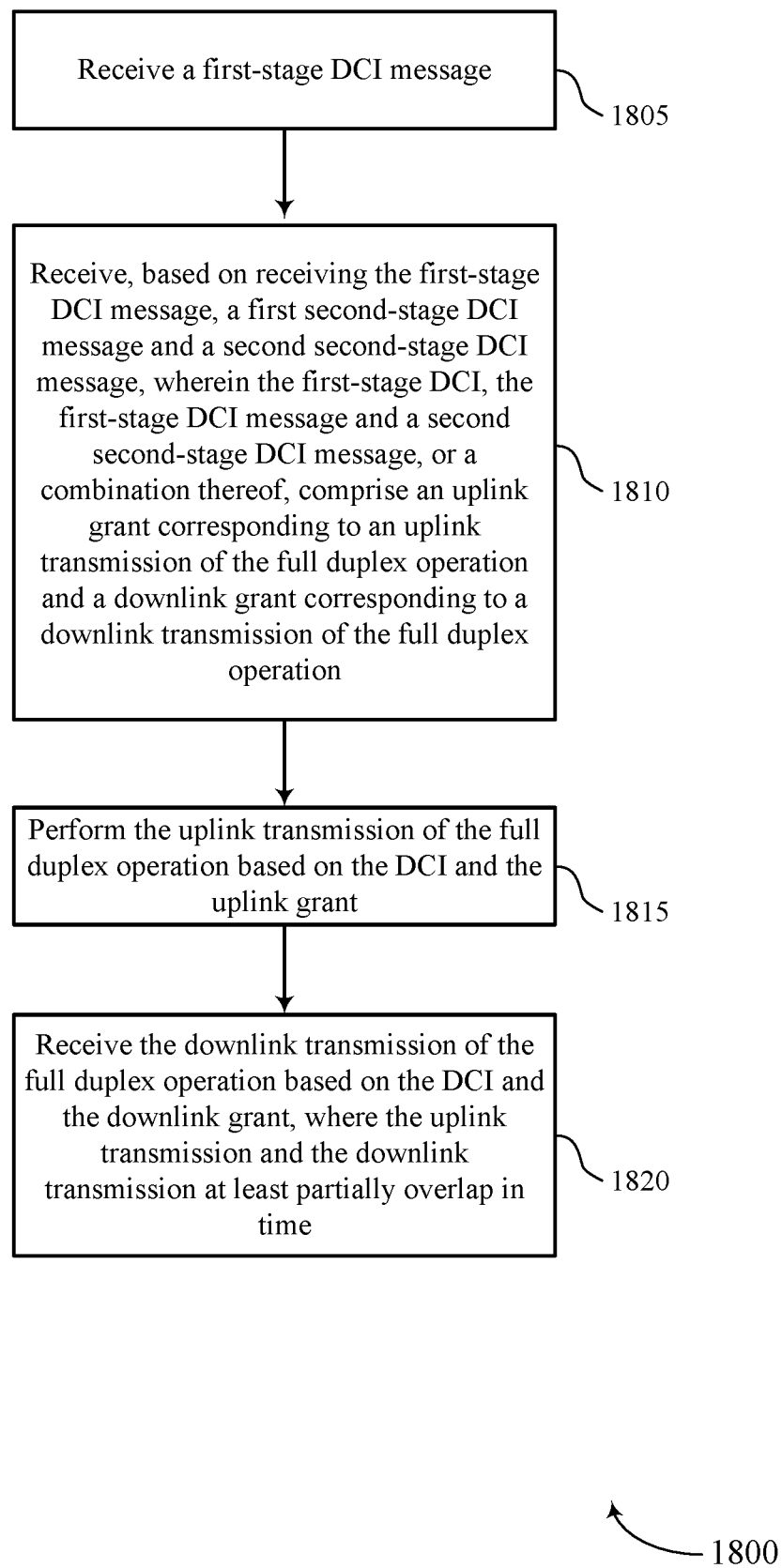

FIG. 18 shows a flowchart illustrating a method 1800 that supports control channel designs for dynamic full duplex enabling in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1805, the UE may receive a first-stage DCI message. The operations of 1805 may be performed according to the methods described herein. In some examples, aspects of the operations of 1805 may be performed by a DCI manager as described with reference to FIGS. 8 through 11.

At 1810, the UE may receive, based on receiving the first-stage DCI message, a first second-stage DCI message and a second second-stage DCI message, wherein the first-stage DCI, the first-stage DCI message and a second second-stage DCI message, or a combination thereof, comprise an uplink grant corresponding to an uplink transmission of the full duplex operation and a downlink grant corresponding to a downlink transmission of the full duplex operation. The operations of 1810 may be performed according to the methods described herein. In some examples, aspects of the operations of 1810 may be performed by a first-stage DCI manager as described with reference to FIGS. 8 through 11.

At 1815, the UE may perform the uplink transmission of the full duplex operation based on the DCI and the uplink grant. The operations of 1815 may be performed according to the methods described herein. In some examples, aspects of the operations of 1815 may be performed by an uplink transmission manager as described with reference to FIGS. 8 through 11.

At 1820, the UE may receive the downlink transmission of the full duplex operation based on the DCI and the downlink grant, where the uplink transmission and the downlink transmission at least partially overlap in time. The operations of 1820 may be performed according to the methods described herein. In some examples, aspects of the operations of 1820 may be performed by a downlink transmission manager as described with reference to FIGS. 8 through 11.

Figure 19:
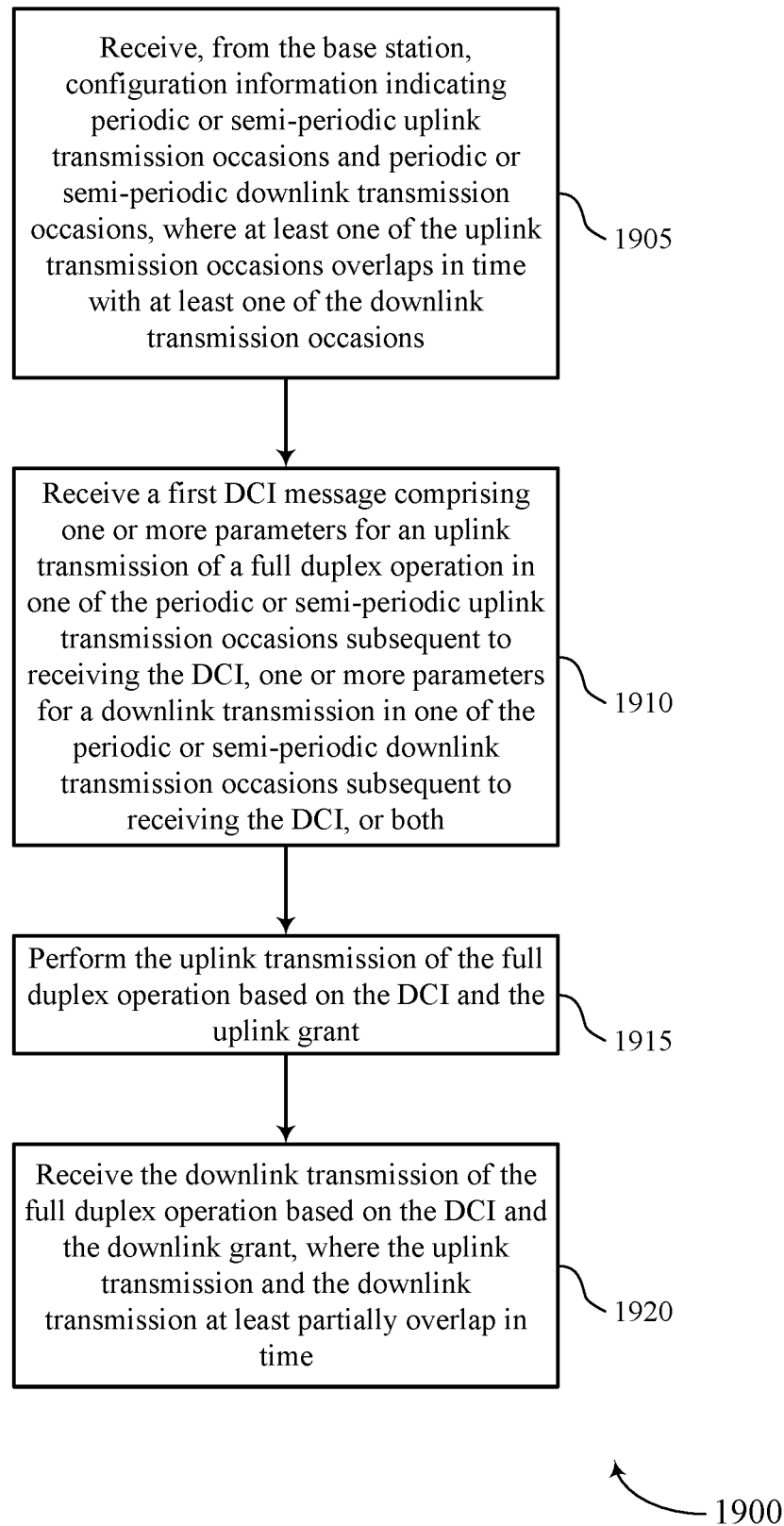

FIG. 19 shows a flowchart illustrating a method 1900 that supports control channel designs for dynamic full duplex enabling in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1905, the UE may receive, from the base station, configuration information indicating periodic or semi-periodic uplink transmission occasions and periodic or semi-periodic downlink transmission occasions, where at least one of the uplink transmission occasions overlaps in time with at least one of the downlink transmission occasions. The operations of 1905 may be performed according to the methods described herein. In some examples, aspects of the operations of 1905 may be performed by a DCI manager as described with reference to FIGS. 8 through 11.

At 1910, the UE may receive, from the base station, a first DCI message comprising one or more parameters for an uplink transmission of a full duplex operation in one of the periodic or semi-periodic uplink transmission occasions subsequent to receiving the DCI, one or more parameters for a downlink transmission in one of the periodic or semi-periodic downlink transmission occasions subsequent to receiving the DCI, or both. The operations of 1910 may be performed according to the methods described herein. In some examples, aspects of the operations of 1910 may be performed by a configuration information manager as described with reference to FIGS. 8 through 11.

At 1915, the UE may perform the uplink transmission of the full duplex operation based on the DCI and the uplink grant. The operations of 1915 may be performed according to the methods described herein. In some examples, aspects of the operations of 1915 may be performed by an uplink transmission manager as described with reference to FIGS. 8 through 11.

At 1920, the UE may receive the downlink transmission of the full duplex operation based on the DCI and the downlink grant, where the uplink transmission and the downlink transmission at least partially overlap in time. The operations of 1920 may be performed according to the methods described herein. In some examples, aspects of the operations of 1920 may be performed by a downlink transmission manager as described with reference to FIGS. 8 through 11.

Figure 20:
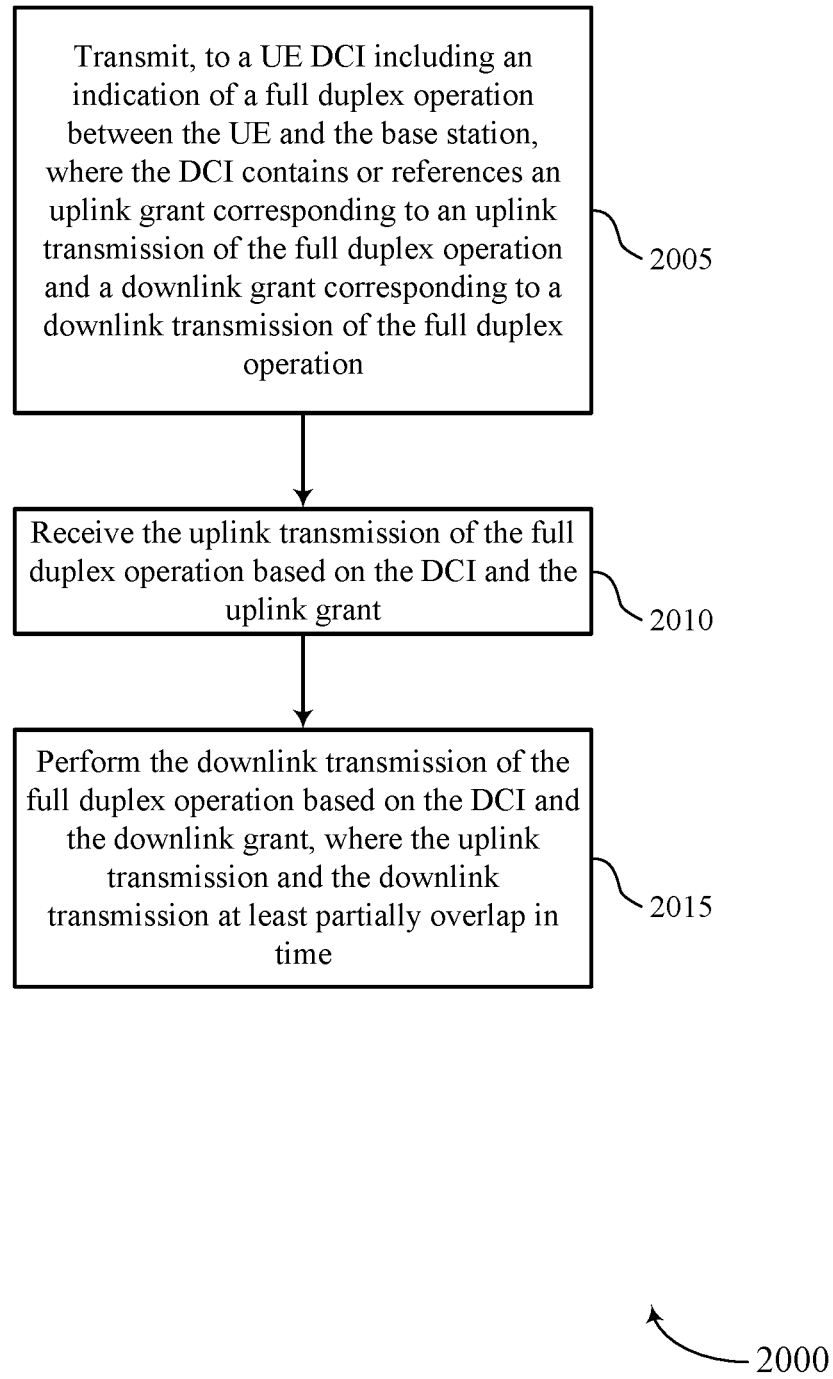

FIG. 20 shows a flowchart illustrating a method 2000 that supports control channel designs for dynamic full duplex enabling in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 2005, the base station may transmit, to a UE DCI including an indication of a full duplex operation between the UE and the base station, where the DCI contains or references an uplink grant corresponding to an uplink transmission of the full duplex operation and a downlink grant corresponding to a downlink transmission of the full duplex operation. The operations of 2005 may be performed according to the methods described herein. In some examples, aspects of the operations of 2005 may be performed by a DCI manager as described with reference to FIGS. 12 through 15.

At 2010, the base station may receive the uplink transmission of the full duplex operation based on the DCI and the uplink grant. The operations of 2010 may be performed according to the methods described herein. In some examples, aspects of the operations of 2010 may be performed by an uplink transmission manager as described with reference to FIGS. 12 through 15.

At 2015, the base station may perform the downlink transmission of the full duplex operation based on the DCI and the downlink grant, where the uplink transmission and the downlink transmission at least partially overlap in time. The operations of 2015 may be performed according to the methods described herein. In some examples, aspects of the operations of 2015 may be performed by a downlink transmission manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving DCI comprising an indication of a full duplex operation between the UE and a base station, wherein the DCI contains or references an uplink grant corresponding to an uplink transmission of the full duplex operation and a downlink grant corresponding to a downlink transmission of the full duplex operation; performing the uplink transmission of the full duplex operation based at least in part on the DCI and the uplink grant; and receiving the downlink transmission of the full duplex operation based at least in part on the DCI and the downlink grant, wherein the uplink transmission and the downlink transmission at least partially overlap in time.

Aspect 2: The method of aspect 1, wherein receiving the DCI comprises: receiving a first DCI message comprising the uplink grant and the downlink grant, the first DCI message comprising one or more dedicated uplink fields comprising information associated with the uplink grant, one or more dedicated downlink fields comprising information associated with the downlink grant, and one or more shared fields comprising information associated with both the uplink grant and the downlink grant.

Aspect 3: The method of aspect 2, further comprising: identifying a RNTI associated with a first type of DCI message, wherein the first DCI message is the first type of DCI message; and decoding the first DCI message based at least in part on the identified RNTI.

Aspect 4: The method of aspect 3, further comprising: receiving, from the base station, an indication of the RNTI, wherein identifying the RNTI is based at least in part on receiving the indication of the RNTI.

Aspect 5: The method of any of aspects 2 through 4, further comprising: identifying a cell RNTI associated with the first DCI message; determining that a size of the first DCI message is different from a size of a second DCI associated with the cell RNTI; and decoding the first DCI message based at least in part on the cell RNTI and the determining that the size of the first DCI message is different from the size of the second DCI.

Aspect 6: The method of any of aspects 2 through 5, further comprising: operating in a full duplex mode on an operating band where at least a first subband is allocated for uplink communications and at least a second subband is allocated for downlink communications, wherein a frequency domain resource assignment (FDRA) field is shared between the uplink grant and the downlink grant, and the uplink transmission and the downlink transmission are within resource blocks indicated by the FDRA field that overlap with the first subband, the second subband, respectively.

Aspect 7: The method of any of aspects 2 through 6, further comprising: identifying, in the one or more shared fields, an indication of a single time domain resource assignment or an indication of a single bandwidth part index associated with both the uplink grant and the downlink grant.

Aspect 8: The method of any of aspects 2 through 7, wherein the first DCI message is configured to schedule no more uplink transmissions than the uplink transmission and no more downlink transmissions than the downlink transmission.

Aspect 9: The method of any of aspects 2 through 8, further comprising: receiving, from the base station, configuration information tables for the one or more shared fields associated with the full duplex operation; and identifying scheduling information for both the uplink grant and the downlink grant in the one or more shared fields of the first DCI message based at least in part on receiving the first DCI message and the configuration information tables.

Aspect 10: The method of aspect 9, wherein the configuration information tables are provided in a radio resource control message, a MAC-CE, or a combination thereof.

Aspect 11: The method of any of aspects 1 through 10, wherein receiving the DCI comprises: receiving a first-stage DCI message; and receiving, based at least in part on receiving the first-stage DCI message, a first second-stage DCI message and a second second-stage DCI message.

Aspect 12: The method of aspect 11, wherein the first-stage DCI message comprises an indication of resources on which to receive the first second-stage DCI message and the second second-stage DCI message; and wherein the first second-stage DCI message comprises the uplink grant and wherein the second second-stage DCI message comprises the downlink grant.

Aspect 13: The method of aspect 12, further comprising: identifying, based at least in part on receiving the first-stage DCI message, a set of one or more PDCCH candidates, one or more aggregation levels, one or more search space set occasions, or a combination thereof; and performing one or more blind decoding procedures on the set of one or more PDCCH candidates based at least in part on the set of one or more PDCCH candidates, the one or more aggregation levels, the one or more search space set occasions, or any combination thereof, wherein receiving the first second-stage DCI message and the second second-stage DCI message is based at least in part on performing the one or more blind decoding procedures.

Aspect 14: The method of aspect 13, further comprising: identifying, based at least in part on receiving the first-stage DCI message, time domain resource assignment information for the uplink transmission and the downlink transmission, wherein the time domain resource assignment information comprises an indication of one or more symbols assigned to the uplink transmission and the downlink transmission, respectively; and configuring one or more transmit antennas, one or more transmit beams, one or more receive antennas, one or more receive beams, or a combination thereof, for switching operations between a half duplex operation and the full duplex operation according to the time domain resource assignment information.

Aspect 15: The method of any of aspects 11 through 14, further comprising: identifying, based at least in part on receiving the first-stage DCI message, time resources, frequency resources, or both for transmitting an acknowledgment message associated with the first-stage DCI message; and transmitting the acknowledgement message on the identified time resources, frequency resources, or both.

Aspect 16: The method of any of aspects 1 through 15, further comprising: receiving, from the base station, configuration information indicating periodic or semi-periodic uplink transmission occasions and periodic or semi-periodic downlink transmission occasions, wherein at least one of the uplink transmission occasions overlaps in time with at least one of the downlink transmission occasions.

Aspect 17: The method of aspect 16, wherein receiving the DCI comprises: receiving a first DCI message comprising one or more parameters for the uplink transmission in one of the periodic or semi-periodic uplink transmission occasions subsequent to receiving the DCI, one or more parameters for the downlink transmission in one of the periodic or semi-periodic downlink transmission occasions subsequent to receiving the DCI, or both.

Aspect 18: The method of aspect 17, wherein the updated parameters comprise a power control, a modulation and coding scheme, a TCI state, or a combination thereof.

Aspect 19: The method of any of aspects 16 through 18, wherein receiving the DCI comprises: receiving a first DCI message comprising an indication that the uplink transmission is scheduled in one of the uplink transmission occasions and the downlink transmission is scheduled in one of the downlink transmission occasions and the uplink transmission overlaps with the downlink transmission, or an indication that the full duplex operation is configured for the at least one of the uplink transmission occasions and the at least one of the downlink transmission occasions.

Aspect 20: The method of aspect 19, further comprising: determining one or more parameters for the uplink transmission and the downlink transmission, based at least in part on the indication that the full duplex operation is configured.

Aspect 21: The method of aspect 20, wherein the one or more parameters comprise power control, a modulation and coding scheme, a TCI state, or a combination thereof.

Aspect 22: The method of any of aspects 19 through 21, further comprising: identifying, based at least in part on receiving the first DCI message, time resources, frequency resources, or both for transmitting an acknowledgment message associated with the first DCI message; and transmitting the acknowledgement message on the identified time resources, frequency resources, or both.

Aspect 23: A method for wireless communications at a base station, comprising: transmitting, to a UE DCI comprising an indication of a full duplex operation between the UE and the base station, wherein the DCI contains or references an uplink grant corresponding to an uplink transmission of the full duplex operation and a downlink grant corresponding to a downlink transmission of the full duplex operation; receiving the uplink transmission of the full duplex operation based at least in part on the DCI and the uplink grant; and performing the downlink transmission of the full duplex operation based at least in part on the DCI and the downlink grant, wherein the uplink transmission and the downlink transmission at least partially overlap in time.

Aspect 24: The method of aspect 23, wherein transmitting the DCI comprises: transmitting a first DCI message comprising the uplink grant and the downlink grant, the first DCI message comprising one or more dedicated uplink fields comprising information associated with the uplink grant, one or more dedicated downlink fields comprising information associated with the downlink grant, and one or more shared fields comprising information associated with both the uplink grant and the downlink grant.

Aspect 25: The method of aspect 24, further comprising: transmitting, to the UE, an indication of a RNTI associated with a first type of DCI message, wherein the first DCI message is the first type of DCI message.

Aspect 26: The method of any of aspects 24 through 25, wherein both the uplink grant and the downlink grant indicate resources that at least partially overlap with a first subband of an operating band, a second subband of an operating band, or both, wherein the first subband is allocated for uplink communications, and the second subband is allocated for downlink communications.

Aspect 27: The method of any of aspects 24 through 26, further comprising: including, in the one or more shared fields, an indication of a single time domain resource assignment or an indication of a single bandwidth part index associated with both the uplink grant and the downlink grant.

Aspect 28: The method of any of aspects 24 through 27, wherein the first DCI message is configured to schedule no more uplink transmissions than the uplink transmission and no more downlink transmissions than the downlink transmission.

Aspect 29: The method of any of aspects 24 through 28, further comprising: transmitting, to the UE, configuration information tables for the one or more shared fields associated with the full duplex operation.

Aspect 30: The method of aspect 29, wherein the configuration information tables are provided in a radio resource control message, a MAC-CE, or a combination thereof.

Aspect 31: The method of any of aspects 23 through 30, wherein transmitting the DCI comprises: transmitting a first-stage DCI message; and transmitting, based at least in part on transmitting the first-stage DCI message, a first second-stage DCI message and a second second-stage DCI message.

Aspect 32: The method of aspect 31, further comprising: the first-stage DCI message comprises an indication of resources on which to receive the first second-stage DCI message and the second second-stage DCI message; and wherein the first second-stage DCI message comprises the uplink grant and wherein the second second-stage DCI message comprises the downlink grant.

Aspect 33: The method of any of aspects 31 through 32, further comprising: including, in the first-stage DCI message, an indication of a set of one or more PDCCH candidates, one or more aggregation levels, one or more search space set occasions, or a combination thereof.

Aspect 34: The method of any of aspects 31 through 33, further comprising: wherein the first-stage DCI message comprises time domain resource assignment information for the uplink transmission and the downlink transmission, wherein the time domain resource assignment information comprises an indication of one or more symbols assigned to the uplink transmission and the downlink transmission, respectively, and wherein receiving the uplink transmission and performing the downlink transmission is based at least in part on the time domain resource assignment information.

Aspect 35: The method of any of aspects 31 through 34, further comprising: including, in the first-stage DCI message, an indication of time resources, frequency resources, or both for transmitting an acknowledgment message associated with the first-stage DCI message; and receiving the acknowledgement message over the indicated time resources, frequency resources, or both.

Aspect 36: The method of any of aspects 23 through 35, further comprising: transmitting, to the UE, configuration information indicating periodic or semi-periodic uplink transmission occasions and periodic or semi-periodic downlink transmission occasions, wherein at least one of the uplink transmission occasions overlaps in time with at least one of the downlink transmission occasions.

Aspect 37: The method of aspect 36, wherein transmitting the DCI comprises: transmitting a first DCI message comprising one or more parameters for the uplink transmission in one of the periodic or semi-periodic uplink transmission occasions subsequent to receiving the DCI, one or more parameters for the downlink transmission in one of the periodic or semi-periodic downlink transmission occasions subsequent to receiving the DCI, or both.

Aspect 38: The method of aspect 37, wherein the updated parameters comprise a power control, a modulation and coding scheme, a TCI state, or a combination thereof.

Aspect 39: The method of any of aspects 36 through 38, wherein transmitting the DCI comprises: transmitting a first DCI message comprising an indication that the uplink transmission is scheduled in one of the uplink transmission occasions and the downlink transmission is scheduled in one of the downlink transmission occasions and the uplink transmission overlaps with the downlink transmission, or an indication that the full duplex operation is configured for the at least one of the uplink transmission occasions and the at least one of the downlink transmission occasions.

Aspect 40: The method of aspect 39, wherein one or more parameters for the uplink transmission and the downlink transmission are associated with the full duplex operation, the one or more parameters comprising power control, a modulation and coding scheme, a TCI state, or a combination thereof.

Aspect 41: The method of any of aspects 36 through 40, further comprising: including, in a first DCI message, an indication of time resources, frequency resources, or both, for transmitting an acknowledgment message associated with the first DCI message; and receiving the acknowledgement message over the indicated time resources, frequency resources, or both.

Aspect 42: An apparatus for wireless communications at a UE, comprising a processor; memory coupled with the processor; and instructions stored in the memory and executable by the processor to cause the apparatus to perform a method of any of aspects 1 through 22.

Aspect 43: An apparatus for wireless communications at a UE, comprising at least one means for performing a method of any of aspects 1 through 22.

Aspect 44: A non-transitory computer-readable medium storing code for wireless communications at a UE, the code comprising instructions executable by a processor to perform a method of any of aspects 1 through 22.

Aspect 45: An apparatus for wireless communications at a base station, comprising a processor; memory coupled with the processor; and instructions stored in the memory and executable by the processor to cause the apparatus to perform a method of any of aspects 23 through 41.

Aspect 46: An apparatus for wireless communications at a base station, comprising at least one means for performing a method of any of aspects 23 through 41.

Aspect 47: A non-transitory computer-readable medium storing code for wireless communications at a base station, the code comprising instructions executable by a processor to perform a method of any of aspects 23 through 41.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
   at least one processor;
   at least one memory coupled with the at least one processor; and
   instructions stored in the at least one memory and executable by the at least one processor to cause the apparatus to:
   receive downlink control information (DCI) comprising an indication of a full duplex operation between the UE and a base station, wherein the DCI contains or references an uplink grant and one or more parameters corresponding to an uplink transmission of the full duplex operation and a downlink grant and one or more parameters corresponding to a downlink transmission of the full duplex operation, wherein the one or more parameters corresponding to the uplink transmission, the one or more parameters corresponding to the downlink transmission, or both comprise a power control, a modulation and coding scheme, a transmission configuration indicator state, or a combination thereof;

perform the uplink transmission of the full duplex operation based at least in part on the DCI and the uplink grant; and receive the downlink transmission of the full duplex operation based at least in part on the DCI and the downlink grant, wherein the uplink transmission and the downlink transmission at least partially overlap in time.

2. The apparatus of claim 1, wherein the instructions to receive the DCI are executable by the at least one processor to cause the apparatus to:

receive a first DCI message comprising the uplink grant and the downlink grant, the first DCI message comprising one or more dedicated uplink fields comprising information associated with the uplink grant, one or more dedicated downlink fields comprising information associated with the downlink grant, and one or more shared fields comprising information associated with both the uplink grant and the downlink grant.

3. The apparatus of claim 2, wherein the instructions are further executable by the at least one processor to cause the apparatus to:

identify a radio network temporary identifier associated with a first type of DCI message, wherein the first DCI message is the first type of DCI message; and decode the first DCI message based at least in part on the identified radio network temporary identifier.

4. The apparatus of claim 3, wherein the instructions are further executable by the at least one processor to cause the apparatus to:

receive, from the base station, an indication of the radio network temporary identifier, wherein identifying the radio network temporary identifier is based at least in part on receiving the indication of the radio network temporary identifier.

5. The apparatus of claim 2, wherein the instructions are further executable by the at least one processor to cause the apparatus to:

identify a cell radio network temporary identifier associated with the first DCI message;

determine that a size of the first DCI message is different from a size of a second DCI associated with the cell radio network temporary identifier; and decode the first DCI message based at least in part on the cell radio network temporary identifier and the determining that the size of the first DCI message is different from the size of the second DCI.

6. The apparatus of claim 2, wherein the instructions are further executable by the at least one processor to cause the apparatus to:

operate in a full duplex mode on an operating band where at least a first subband is allocated for uplink communications and at least a second subband is allocated for downlink communications, wherein a frequency domain resource assignment (FDRA) field is shared between the uplink grant and the downlink grant, and the uplink transmission and the downlink transmission are within resource blocks indicated by the FDRA field that overlap with the first subband, the second subband, respectively.

7. The apparatus of claim 2, wherein the instructions are further executable by the at least one processor to cause the apparatus to:

identify, in the one or more shared fields, an indication of a single time domain resource assignment or an indication of a single bandwidth part index associated with both the uplink grant and the downlink grant.

8. The apparatus of claim 2, wherein the first DCI message is configured to schedule no more uplink transmissions than the uplink transmission and no more downlink transmissions than the downlink transmission.

9. The apparatus of claim 2, wherein the instructions are further executable by the at least one processor to cause the apparatus to:

receive, from the base station, configuration information tables for the one or more shared fields associated with the full duplex operation; and identify scheduling information for both the uplink grant and the downlink grant in the one or more shared fields of the first DCI message based at least in part on receiving the first DCI message and the configuration information tables.

10. The apparatus of claim 9, wherein the configuration information tables are provided in a radio resource control message, a media access control (MAC) control element (CE), or a combination thereof.

11. The apparatus of claim 1, wherein the instructions to receive the DCI are executable by the at least one processor to cause the apparatus to:

receive a first-stage DCI message; and receive, based at least in part on receiving the first-stage DCI message, a first second-stage DCI message and a second second-stage DCI message.

12. The apparatus of claim 11, wherein:

the first-stage DCI message comprises an indication of resources on which to receive the first second-stage DCI message and the second second-stage DCI message; and wherein the first second-stage DCI message comprises the uplink grant and wherein the second second-stage DCI message comprises the downlink grant.

13. The apparatus of claim 12, wherein the instructions are further executable by the at least one processor to cause the apparatus to:

identify, based at least in part on receiving the first-stage DCI message, a set of one or more physical downlink control channel candidates, one or more aggregation levels, one or more search space set occasions, or a combination thereof; and perform one or more blind decoding procedures on the set of one or more physical downlink control channel candidates based at least in part on the set of one or more physical downlink control channel candidates, the one or more aggregation levels, the one or more search space set occasions, or any combination thereof, wherein receiving the first second-stage DCI message and the second second-stage DCI message is based at least in part on performing the one or more blind decoding procedures.

14. The apparatus of claim 13, wherein the instructions are further executable by the at least one processor to cause the apparatus to:

identify, based at least in part on receiving the first-stage DCI message, time domain resource assignment information for the uplink transmission and the downlink transmission, wherein the time domain resource assignment information comprises an indication of one or more symbols assigned to the uplink transmission and the downlink transmission, respectively; and configure one or more transmit antennas, one or more transmit beams, one or more receive antennas, one or more receive beams, or a combination thereof, for switching operations between a half duplex operation and the full duplex operation according to the time domain resource assignment information.

15. The apparatus of claim 11, wherein the instructions are further executable by the at least one processor to cause the apparatus to:

identify, based at least in part on receiving the first-stage DCI message, time resources, frequency resources, or both for transmitting an acknowledgment message associated with the first-stage DCI message; and transmit the acknowledgement message on the identified time resources, frequency resources, or both.

16. The apparatus of claim 1, wherein the instructions are further executable by the at least one processor to cause the apparatus to:

receive, from the base station, configuration information indicating periodic or semi-periodic uplink transmission occasions and periodic or semi-periodic downlink transmission occasions, wherein at least one of the uplink transmission occasions overlaps in time with at least one of the downlink transmission occasions.

17. The apparatus of claim 16, wherein the instructions to receive the DCI are executable by the at least one processor to cause the apparatus to:

receive a first DCI message comprising the one or more parameters for the uplink transmission in one of the periodic or semi-periodic uplink transmission occasions subsequent to receiving the DCI, the one or more parameters for the downlink transmission in one of the periodic or semi-periodic downlink transmission occasions subsequent to receiving the DCI, or both.

18. The apparatus of claim 16, wherein the instructions to receive the DCI are executable by the at least one processor to cause the apparatus to:

receive a first DCI message comprising an indication that the uplink transmission is scheduled in one of the uplink transmission occasions and the downlink transmission is scheduled in one of the downlink transmission occasions and the uplink transmission overlaps with the downlink transmission, or an indication that the full duplex operation is configured for the at least one of the uplink transmission occasions and the at least one of the downlink transmission occasions.

19. The apparatus of claim 18, wherein the instructions are further executable by the at least one processor to cause the apparatus to:

determine the one or more parameters for the uplink transmission and the one or more parameters for the downlink transmission, based at least in part on the indication that the full duplex operation is configured.

20. The apparatus of claim 18, wherein the instructions are further executable by the at least one processor to cause the apparatus to:

identify, based at least in part on receiving the first DCI message, time resources, frequency resources, or both for transmitting an acknowledgment message associated with the first DCI message; and transmit the acknowledgement message on the identified time resources, frequency resources, or both.

21. An apparatus for wireless communications at a base station, comprising:

at least one processor;

at least one memory coupled with the at least one processor; and instructions stored in the at least one memory and executable by the at least one processor to cause the apparatus to:

transmit, to a user equipment (UE) downlink control information (DCI) comprising an indication of a full duplex operation between the UE and the base station, wherein the DCI contains or references an uplink grant and one or more parameters corresponding to an uplink transmission of the full duplex operation and a downlink grant and one or more parameters corresponding to a downlink transmission of the full duplex operation, wherein the one or more parameters corresponding to the uplink transmission, the one or more parameters corresponding to the downlink transmission, or both comprise a power control, a modulation and coding scheme, a transmission configuration indicator state, or a combination thereof;

receive the uplink transmission of the full duplex operation based at least in part on the DCI and the uplink grant; and perform the downlink transmission of the full duplex operation based at least in part on the DCI and the downlink grant, wherein the uplink transmission and the downlink transmission at least partially overlap in time.

22. The apparatus of claim 21, wherein the instructions to transmit the DCI are executable by the at least one processor to cause the apparatus to:

transmit a first DCI message comprising the uplink grant and the downlink grant, the first DCI message comprising one or more dedicated uplink fields comprising information associated with the uplink grant, one or more dedicated downlink fields comprising information associated with the downlink grant, and one or more shared fields comprising information associated with both the uplink grant and the downlink grant.

23. The apparatus of claim 22, wherein the instructions are further executable by the at least one processor to cause the apparatus to:

transmit, to the UE, an indication of a radio network temporary identifier associated with a first type of DCI message, wherein the first DCI message is the first type of DCI message.

24. The apparatus of claim 21, wherein the instructions to transmit the DCI are executable by the at least one processor to cause the apparatus to:

transmit a first-stage DCI message; and transmit, based at least in part on transmitting the first-stage DCI message, a first second-stage DCI message and a second second-stage DCI message.

25. The apparatus of claim 21, wherein the instructions are further executable by the at least one processor to cause the apparatus to:

transmit, to the UE, configuration information indicating periodic or semi-periodic uplink transmission occasions and periodic or semi-periodic downlink transmission occasions, wherein at least one of the uplink transmission occasions overlaps in time with at least one of the downlink transmission occasions.

26. The apparatus of claim 25, wherein the instructions to transmit the DCI are executable by the at least one processor to cause the apparatus to:

transmit a first DCI message comprising the one or more parameters for the uplink transmission in one of the periodic or semi-periodic uplink transmission occasions subsequent to receiving the DCI, the one or more parameters for the downlink transmission in one of the periodic or semi-periodic downlink transmission occasions subsequent to receiving the DCI, or both.

27. A method for wireless communications at a user equipment (UE), comprising:

receiving downlink control information (DCI) comprising an indication of a full duplex operation between the UE and a base station, wherein the DCI contains or references an uplink grant and one or more parameters corresponding to an uplink transmission of the full duplex operation and a downlink grant and one or more parameters corresponding to a downlink transmission of the full duplex operation, wherein the one or more parameters corresponding to the uplink transmission, the one or more parameters corresponding to the downlink transmission, or both comprise a power control, a modulation and coding scheme, a transmission configuration indicator state, or a combination thereof;

performing the uplink transmission of the full duplex operation based at least in part on the DCI and the uplink grant; and receiving the downlink transmission of the full duplex operation based at least in part on the DCI and the downlink grant, wherein the uplink transmission and the downlink transmission at least partially overlap in time.

28. A method for wireless communications at a base station, comprising:

transmitting, to a user equipment (UE) downlink control information (DCI) comprising an indication of a full duplex operation between the UE and the base station, wherein the DCI contains or references an uplink grant and one or more parameters corresponding to an uplink transmission of the full duplex operation and a downlink grant and one or more parameters corresponding to a downlink transmission of the full duplex operation, wherein the one or more parameters corresponding to the uplink transmission, the one or more parameters corresponding to the downlink transmission, or both comprise a power control, a modulation and coding scheme, a transmission configuration indicator state, or a combination thereof;

receiving the uplink transmission of the full duplex operation based at least in part on the DCI and the uplink grant; and performing the downlink transmission of the full duplex operation based at least in part on the DCI and the downlink grant, wherein the uplink transmission and the downlink transmission at least partially overlap in time.

* * * * *